(12) United States Patent
Srinivasan et al.

(10) Patent No.: US 12,473,292 B2
(45) Date of Patent: Nov. 18, 2025

(54) POLYMORPHS OF 7-CYCLOPENTYL-N,N-DIMETHYL-2-{[5-(PIPERAZIN-1-YL) PYRIDIN-2-YL]-AMINO}-7H-PYRROLO [2,3-D]PYRIMIDINE-6-CARBOXAMIDE AND ITS PHARMACEUTICALLY ACCEPTABLE SALTS AND PROCESS FOR THE PREPARATION THEREOF

(71) Applicants: MSN LABORATORIES PRIVATE LIMITED, R&D CENTER, Hyderabad (IN); Thirumalai Rajan Srinivasan, Hyderabad (IN)

(72) Inventors: Thirumalai Rajan Srinivasan, Hyderabad (IN); Eswaraiah Sajja, Hyderabad (IN); Satyanarayana Revu, Hyderabad (IN); Rajeshwar Reddy Sagyam, Hyderabad (IN); Srinivasulu Rangineni, Hyderabad (IN); Ravichandran Srinivasan, Hyderabad (IN); Venkata Narasayya Saladi, Hyderabad (IN); Naveen Ragam, Hyderabad (IN)

(73) Assignee: MSN Laboratories Private Limited, R&D Center, Hyderabad (IN)

( * ) Notice: Subject to any disclaimer, the term of this patent is extended or adjusted under 35 U.S.C. 154(b) by 988 days.

(21) Appl. No.: 17/606,827

(22) PCT Filed: Apr. 29, 2020

(86) PCT No.: PCT/IN2020/050391
§ 371 (c)(1),
(2) Date: Oct. 27, 2021

(87) PCT Pub. No.: WO2020/222256
PCT Pub. Date: Nov. 5, 2020

(65) Prior Publication Data
US 2022/0204514 A1 Jun. 30, 2022

(30) Foreign Application Priority Data

Apr. 29, 2019 (IN) .............................. 201941016934
Jul. 15, 2019 (IN) .............................. 201941028438
Aug. 7, 2019 (IN) .............................. 201941032023

(51) Int. Cl.
C07D 487/04 (2006.01)
A61P 35/00 (2006.01)
C07C 57/13 (2006.01)

(52) U.S. Cl.
CPC ............ *C07D 487/04* (2013.01); *A61P 35/00* (2018.01); *C07C 57/13* (2013.01); *C07B 2200/13* (2013.01)

(58) Field of Classification Search
CPC ....... C07D 487/04; A61P 35/00; C07C 57/13; C07B 2200/13
See application file for complete search history.

(56) References Cited

FOREIGN PATENT DOCUMENTS

WO WO-2019082143 A1 * 5/2019 ........... A61K 31/496
WO WO-2019111160 A1 * 6/2019

OTHER PUBLICATIONS

Search Steategy dated Aug. 26, 2020 in the file history of the corresponding international application.
(Continued)

*Primary Examiner* — Noble E Jarrell
*Assistant Examiner* — Phillip Matthew Rzeczycki
(74) *Attorney, Agent, or Firm* — IP Pundit LLC

(57) ABSTRACT

The present invention relates to novel crystalline forms of butanedioic acid 7-cyclopentyl-N,N-dimethyl-2-{[5-(piperazin-1-yl) pyridin-2-yl]amino}-7H-pyrrolo[2,3-d]pyrimidine-6-carboxamide of formula-la and process for preparation thereof.

(Continued)

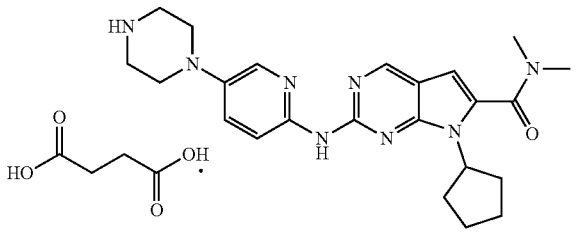

Formula-1a

The present invention also relates to a process for the preparation of 7-cyclopentyl-N,N-dimethyl-2-{[5-(piperazin-1-yl)pyridin-2-yl]amino}-7H-pyrrolo[2,3-d] pyrimidine-6-carboxamide.

Further, the present application also relates to acid addition salts of 7-cyclopentyl-N,N-dimethyl-2-{[5-(piperazin-1-yl)pyridin-2-yl]amino}-7H-pyrrolo[2,3-d] pyrimidine-6-carboxamide and process for the preparation thereof.

7 Claims, 11 Drawing Sheets

(56) References Cited

OTHER PUBLICATIONS

International Search Report dated Aug. 27, 2020.
Written Opinion of the International Searching Authority dated Aug. 27, 2020.

* cited by examiner

POLYMORPHS OF 7-CYCLOPENTYL-N,N-DIMETHYL-2-{[5-(PIPERAZIN-1-YL) PYRIDIN-2-YL]-AMINO}-7H-PYRROLO [2,3-D]PYRIMIDINE-6-CARBOXAMIDE AND ITS PHARMACEUTICALLY ACCEPTABLE SALTS AND PROCESS FOR THE PREPARATION THEREOF

RELATED APPLICATION

This application is a U.S. National Stage application of PCT International Patent Application Number PCT/IN2020/050391, which was filed on Apr. 29, 2020, which claims the benefit of priority of the Indian patents application Ser. Nos. 20/194,1016934 filed on Apr. 29, 2019, 201941028438 filed on Jul. 15, 2019, and 201941032023 filed on Aug. 7, 2019, the disclosures of all of which are incorporated herein by reference.

FIELD OF THE INVENTION

The present invention relates to acid addition salts of cyclopentyl-N,N-dimethyl-2-{[5-(piperazin-1-yl) pyridin-2-yl]amino}-7H-pyrrolo[2,3-d] pyrimidine-6-carboxamide of formula-1, its polymorphs and their process for preparation thereof.

Formula-1

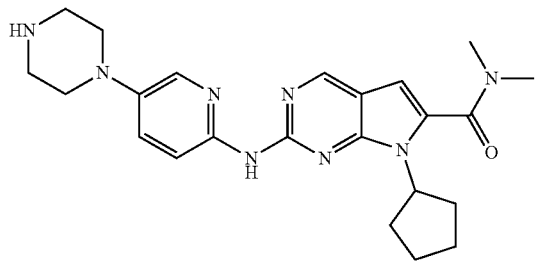

The present invention also relates to novel crystalline forms of butanedioic acid 7-cyclopentyl-N,N-dimethyl-2-{[5-(piperazin-1-yl) pyridin-2-yl]amino}-7H-pyrrolo[2,3-d]pyrimidine-6-carboxamide and process for preparation thereof.

Further, the present invention also relates to an improved process for the preparation of 7-cyclopentyl-N,N-dimethyl-2-{[5-(piperazin-1-yl)pyridin-2-yl]amino}-7H-pyrrolo[2,3-d]pyrimidine-6-carboxamide or its pharmaceutically acceptable salts.

BACKGROUND OF THE INVENTION 7-cyclopentyl-N,N-dimethyl-2-{[5-(piperazin-1-yl) pyridin-2-yl]amino}-7H-pyrrolo [2,3-d]pyrimidine-6-carboxamide is generally known as Ribociclib. Its succinic acid salt having the structural formula-1a was approved in US and Europe under the brand name of Kisqali® and it is a kinase inhibitor indicated in combination with an aromatase inhibitor as initial endocrine-based therapy for the treatment of postmenopausal women with hormone receptor (HR)-positive, human epidermal growth factor receptor 2 (HER2)-negative advanced or metastatic breast cancer. The structural formula of Butanedioic acid-7-cyclopentyl-N,N-dimethyl-2-{[5-(piperazin-1-yl)pyridin-2-yl]amino}-7H-pyrrolo[2,3-d]pyrimidine-6-carboxamide (1/1) of formula-1a is given below:

Formula-1a

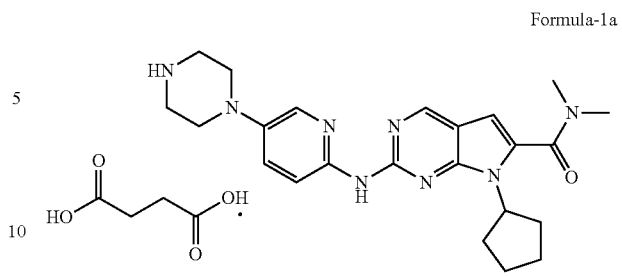

Butanedioic acid-7-cyclopentyl-N,N-dimethyl-2-{[5-(piperazin-1-yl)pyridin-2-yl]amino}-7H-pyrrolo[2,3-d]pyrimidine-6-carboxamide herein after also referred as 7-cyclopentyl-N,N-dimethyl-2-{[5-(piperazin-1-yl)pyridin-2-yl]amino}-7H-pyrrolo [2,3-d]pyrimidine-6-carboxamide succinate or Ribociclib Succinate.

Various crystalline polymorphs of Butanedioic acid-7-cyclopentyl-N,N-dimethyl-2-{[5-(piperazin-1-yl)pyridin-2-yl]amino}-7H-pyrrolo[2,3-d]pyrimidine-6-carboxamide are known in the literature.

U.S. Pat. No. 9,193,732 (hereinafter referred as the US' 732 patent) discloses the polymorphic form of compound of formula-1a.

The patent applications/publications U.S. Pat. No. 9,994,579B2, WO2019019959, WO2019040567A1, WO2019082143A1, WO2019111160A1 & WO2019123364A1 also discloses the polymorphs of Ribociclib Succinate.

Still, there is a significant need in the art to develop polymorphs of Butanedioic acid-7-cyclopentyl-N,N-dimethyl-2-{[5-(piperazin-1-yl)pyridin-2-yl]amino}-7H-pyrrolo[2,3-d]pyrimidine-6-carboxamide which are advantageous over prior art forms to meet the pharmaceuticals requirements.

Since the development of new polymorphic forms of an active pharmaceutical ingredient provides new opportunity to improve the performance characteristics of pharmaceutical finished product, the development of new polymorphic forms is always encouraged.

Furthermore, solid state study of an active pharmaceutical ingredient aims to widen the variety of crystalline forms that a formulation scientist has available for designing a pharmaceutical dosage form with desired characteristics.

After numerous trials and earnest efforts, the present inventors surprisingly found novel crystalline polymorphs of 7-cyclopentyl-N,N-dimethyl-2-{[5-(piperazin-1-yl) pyridin-2-yl]amino}-7H-pyrrolo[2,3-d]pyrimidine-6-carboxamide and its pharmaceutically acceptable salts having advantageous properties which is useful and well suitable for the preparation of various pharmaceutical compositions.

The present inventors also developed acid addition salts of 7-cyclopentyl-N,N-dimethyl-2-{[5-(piperazin-1-yl) pyridin-2-yl]amino}-7H-pyrrolo[2,3-d]pyrimidine-6-carboxamide.

U.S. Pat. No. 8,415,355 (hereinafter described as US '355) first discloses the process for the preparation of 7-cyclopentyl-N,N-dimethyl-2-{[5-(piperazin-1-yl) pyridin-2-yl]amino}-7H-pyrrolo[2,3-d]pyrimidine-6-carboxamide with low yield and less purity.

The present inventors developed a process for the preparation of Ribociclib or its pharmaceutically acceptable salts using novel key starting materials. Ribociclib or its pharmaceutically acceptable salts prepared according to the present invention provides highly pure compound with a good yield.

BRIEF DESCRIPTION OF THE INVENTION

The first embodiment of the present invention is to provide a novel crystalline form of Butanedioic acid-7-cyclopentyl-N,N-dimethyl-2-{[5-(piperazin-1-yl)pyridin-2-yl]amino}-7H-pyrrolo[2,3-d]pyrimidine-6-carboxamide compound of formula-1a, herein after designated as crystalline form-M and its process for the preparation.

The second embodiment of the present invention is to provide a novel crystalline form of Butanedioic acid-7-cyclopentyl-N,N-dimethyl-2-{[5-(piperazin-1-yl)pyridin-2-yl]amino}-7H-pyrrolo[2,3-d]pyrimidine-6-carboxamide compound of formula-1a, herein after designated as crystalline form-S and its process for the preparation.

The third embodiment of the present invention is to provide a novel crystalline form of Butanedioic acid 7-cyclopentyl-N,N-dimethyl-2-{[5-(piperazin-1-yl)pyridin-2-yl]amino}-7H-pyrrolo[2,3-d]pyrimidine-6-carboxamide compound of formula-1a, herein after designated as crystalline form-N and its process for the preparation.

The fourth embodiment of present of present invention is to provide an acid addition salt of 7-cyclopentyl-N,N-dimethyl-2-{[5-(piperazin-1-yl) pyridin-2-yl]amino}-7H-pyrrolo[2,3-d]pyrimidine-6-carboxamide wherein the acid is selected from a group consisting of benzoic acid, fumaric acid, DL-mandelic acid, 4-hydroxybenzoic acid and salicylic acid and its processes for the preparation thereof.

The fifth embodiment of the present invention is to provide a novel crystalline form of Ribociclib Succinate compound of formula-1a, herein after designated as crystalline form-N1.

The sixth embodiment of the present invention is to provide a process for the preparation of crystalline form-N1 of Ribociclib Succinate compound of formula-1a.

The seventh embodiment of the present invention is to provide a process for the preparation of compound of formula-1 or its pharmaceutically acceptable salts.

The eighth embodiment of the present invention is to provide 5-(4-tritylpiperazin-1-yl)pyridin-2-amine compound of formula-6.

The ninth embodiment of the present invention is to provide a process for the preparation of 5-(4-tritylpiperazin-1-yl)pyridin-2-amine compound of formula-6.

The tenth embodiment of the present invention is to provide 7-cyclopentyl-N,N-dimethyl-2-((5-(4-tritylpiperazin-1-yl) pyridine-2-yl)amino)-7H-pyrrolo[2,3-d]pyrimidine-6-carboxamide compound of formula-8.

The eleventh embodiment of the present invention is to provide a process for the preparation of 7-cyclopentyl-N,N-dimethyl-2-((5-(4-tritylpiperazin-1-yl)pyridine-2-yl) amino)-7H-pyrrolo [2,3-d]pyrimidine-6-carboxamide compound of formula-8.

DETAILED DESCRIPTION OF THE INVENTION

The "suitable solvent" used in the present invention can be selected from but not limited to "hydrocarbon solvents" such as n-pentane, n-hexane, n-heptane, cyclohexane, petroleum ether, benzene, toluene, xylene and mixtures thereof, "ether solvents" such as dimethyl ether, diethyl ether, diisopropyl ether, methyl tert-butyl ether, 1,2-dimethoxyethane, tetrahydrofuran, 1,4-dioxane and mixtures thereof; "ester solvents" such as methyl acetate, ethyl acetate, n-propyl acetate, isopropyl acetate, n-butyl acetate, isobutyl acetate, tert-butyl acetate and mixtures thereof, "polar-aprotic solvents" such as dimethylacetamide, dimethylformamide, dimethylsulfoxide, N-methylpyrrolidone (NMP) and mixtures thereof, "chloro solvents" such as dichloromethane, dichloroethane, chloroform, carbon tetrachloride and mixtures thereof; "ketone solvents" such as acetone, methyl ethyl ketone, methyl isobutyl ketone and mixtures thereof, "nitrile solvents" such as acetonitrile, propionitrile, isobutyronitrile and mixtures thereof; "alcohol solvents" such as methanol, ethanol, n-propanol, isopropanol (or) isopropyl alcohol, n-butanol, iso-butanol, 2-butanol, tert-butanol, ethane-1,2-diol, propane-1,2-diol and mixtures thereof; "polar solvents" such as water; formic acid, acetic acid and the like or mixture of any of the afore mentioned solvents.

The term "acid addition salts" herein after also referred as "pharmaceutically acceptable salts" which are selected from inorganic acid such as hydrochloric acid, hydrobromic acid, sulfuric acid, nitric acid, phosphoric acid etc; organic acids such as acetic acid, maleic acid, malic acid, tartaric acid, oxalic acid, succinic acid, trifluoroacetic acid, methane sulfonic acid, benzoic acid, fumaric acid, 4-hydroxybenzoic acid, salicylic acid, p-toluene sulfonic acid, ethane sulfonic acid; chiral acids such as S-(+) mandelic acid, R-(−) mandelic acid, DL-mandelic acid, L-(+)tartaric acid, D-(−)tartaric acid, L-malic acid, D-malic acid, D-maleic acid, (−)-naproxen, (+)-naproxen, (1R)-(−)-camphor sulfonic acid, (1S)-(+)-camphor sulfonic acid, (1R)-(+)-bromocamphor-10-sulfonic acid, (1S)-(−)-bromocamphor-10-sulfonic acid, (−)-Dibenzoyl-L-tartaric acid, (−)-Dibenzoyl-L-tartaricacid monohydrate, (+)-Dibenzoyl-D-tartaric acid, (+)-Dibenzoyl-D-tartaric acid monohydrate, (+)-dipara-tolyl-D-tataric acid, (−)-dipara-tolyl-L-tataricacid, L(−)-pyroglutamic acid, L(+)-pyroglutamic acid, (−)-lactic acid, L-lysine, D-lysine etc., and like.

The first embodiment of the present invention provides novel crystalline form of Ribociclib succinate of formula-1a, herein after the said crystalline form is designated as crystalline form-M.

Figure 1:
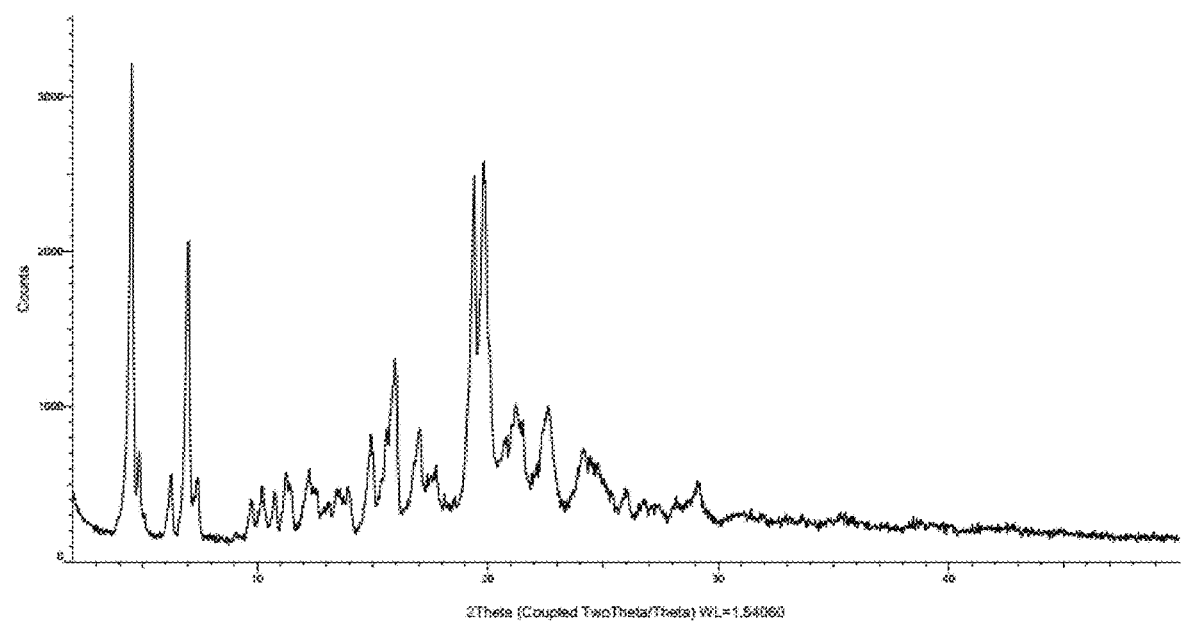
FIG. 1: Illustrates the PXRD pattern of crystalline form-M of Ribociclib succinate.
Figure 2:
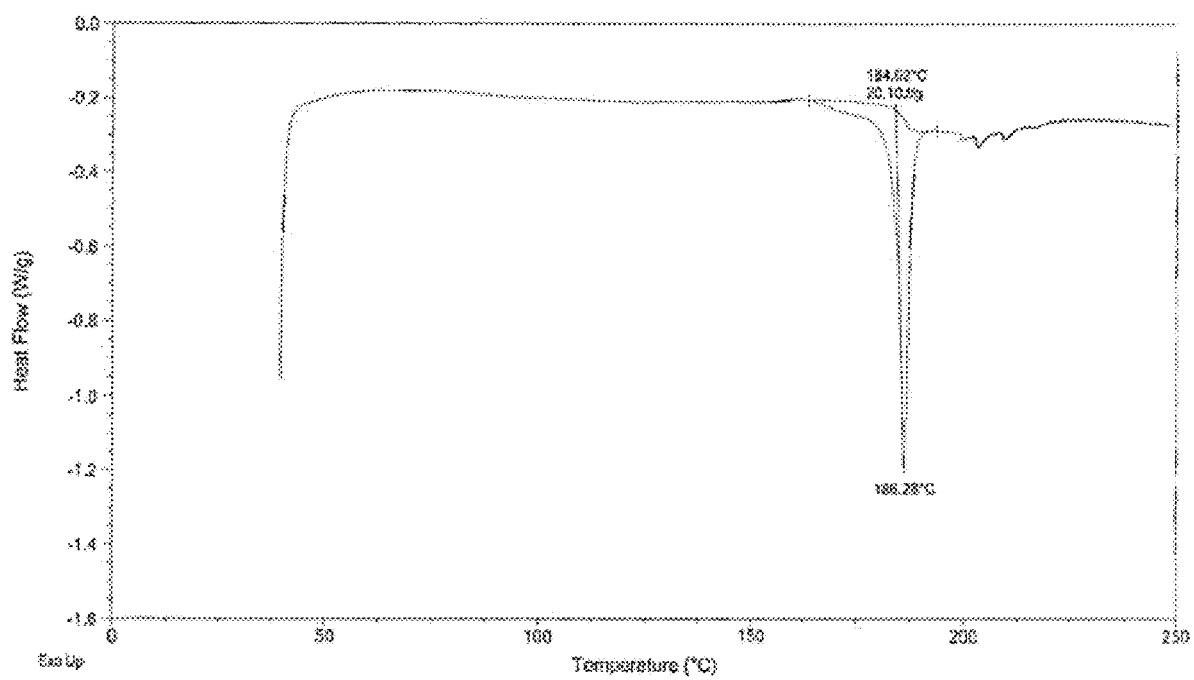
FIG. 2: Illustrates the DSC thermogram of crystalline form-M of Ribociclib succinate.

The crystalline form-M is characterized by its PXRD pattern having peaks at about 4.5°, 4.8, 6.2°, 7.0°, 7.3° 10.2°, 12.2°, 14.9°, 15.9°, 16.9°, 19.4°, 19.8°, 21.2°, 22.6° and 24.2°±0.2° of 2-theta and further illustrated in FIG. 1, DSC thermogram as illustrated in FIG. 2.

An aspect of the first embodiment provides a process for the preparation of crystalline form-M of Ribociclib succinate of formula-1a, comprising:
a) providing a solution of Ribociclib free base in a solvent selected from alcohol solvent, ester solvent, ether solvent and mixtures thereof,
b) treating the solution obtained in step-a) with succinic acid;
c) isolating crystalline form-M of Ribociclib succinate of formula-1a.

Wherein, providing the solution of Ribociclib in step-a) can be done by optionally heating the mixture to a temperature ranging from about 35° C. to reflux temperature of the solvent used. Alcohol solvent in step a) is selected from methanol, ethanol, iso-amylalcohol, n-propanol, iso-propanol, n-butanol, iso-butanol, 2-butanol, tert-butanol, ethane-1,2-diol, propane-1,2-diol and mixtures thereof; ether solvent in step-a) is selected from dimethyl ether, diethyl ether, diisopropyl ether, methyl tert-butyl ether, 1,2-dimethoxyethane, tetrahydrofuran, 1,4-dioxane and mixtures thereof; ester solvent is selected from methyl acetate, ethyl acetate, n-propyl acetate, isopropyl acetate, n-butyl acetate, isobutyl acetate, tert-butyl acetate and mixtures thereof; isolating crystalline form-M in step-c) is done by removal of solvent using known techniques which are selected from distillation, decanting, filtration, cooling the mixture to lower temperatures to precipitate the solid followed by filtration of the mixture, crystallization or by adding a solvent which is different from the solvent used in step-a) selected from methyl acetate, ethyl acetate, n-propyl acetate, isopropyl acetate, n-butyl acetate, isobutyl acetate, tert-butyl acetate and mixtures thereof. Further, treating of succinic acid in step-b) carried out directly or taking by dissolving in a solvent.

The second embodiment of the present invention provides novel crystalline form of Ribociclib succinate of formula-1a, herein after the crystalline form is designated as crystalline form-S.

Figure 3:
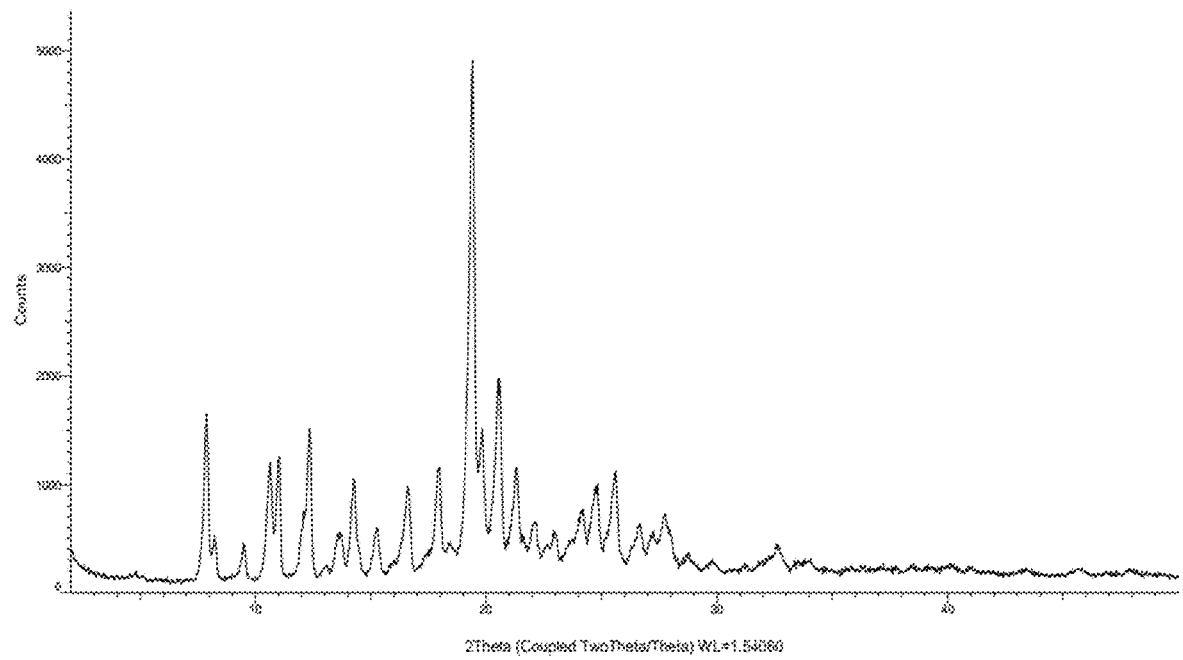
FIG. 3: Illustrates the PXRD pattern of crystalline form-S of Ribociclib succinate.
Figure 4:
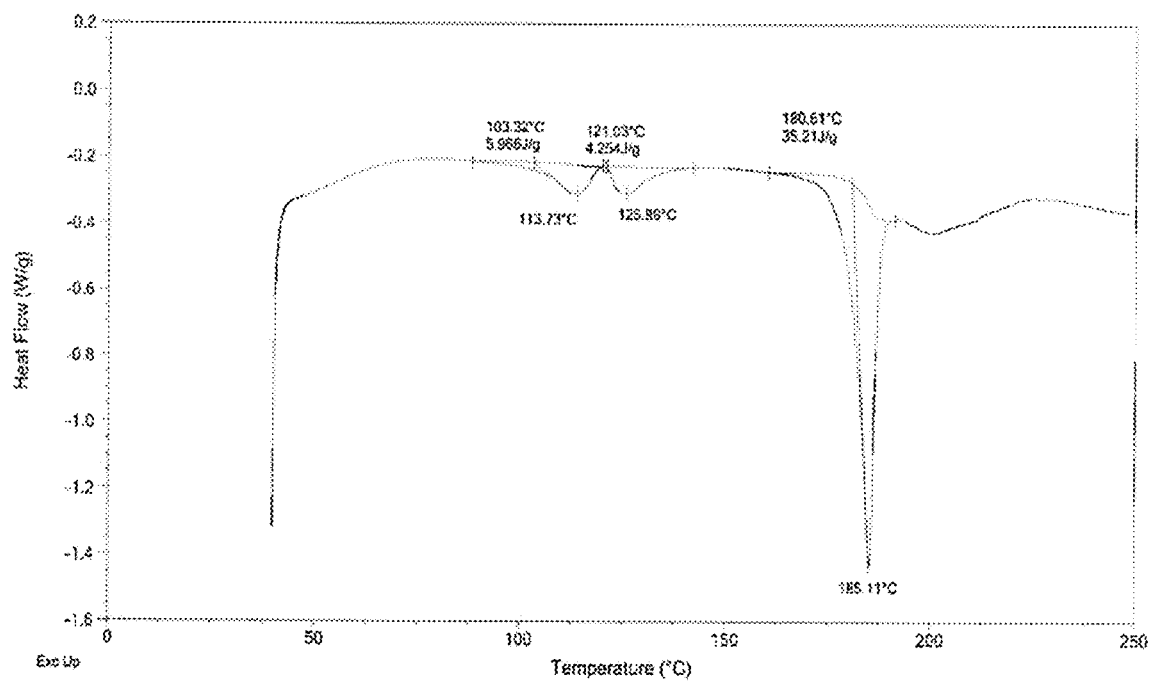
FIG. 4: Illustrates the DSC thermogram of crystalline form-S of Ribociclib succinate.

The crystalline form-S of Ribociclib succinate of formula-1a is characterized by its PXRD pattern having peaks at about 7.8°, 10.6°, 10.9°, 12.2°, 17.9°, 19.3°, 20.5°, 21.2°, 24.7° and 25.5°±0.2° of 2-theta and further characterized by its PXRD pattern as illustrated in FIG. 3, DSC thermogram as illustrated in FIG. 4.

An aspect of the second embodiment provides a process for the preparation of crystalline form-S of Ribociclib succinate comprising:
a) combining Ribociclib succinate of formula-1a with 1,4-dioxane or mixture of 1,4-dioxane and another solvent;
b) isolating the crystalline form-S of compound of formula-1a.

Further aspect, the mixture obtained in step-a) optionally heating to a temperature ranges from about 35° C. to reflux temperature of the solvent used; isolating crystalline form-S in step b) is done by removal of solvent using known techniques like decantation, filtration by gravity or suction, centrifugation, adding solvent to make slurry followed by filtration, or other techniques specific to the equipment used, and optionally washing with a solvent.

The third embodiment of the present invention provides novel crystalline form of Ribociclib succinate of formula-1a, herein after the crystalline form is designated as crystalline form-N.

Figure 5:
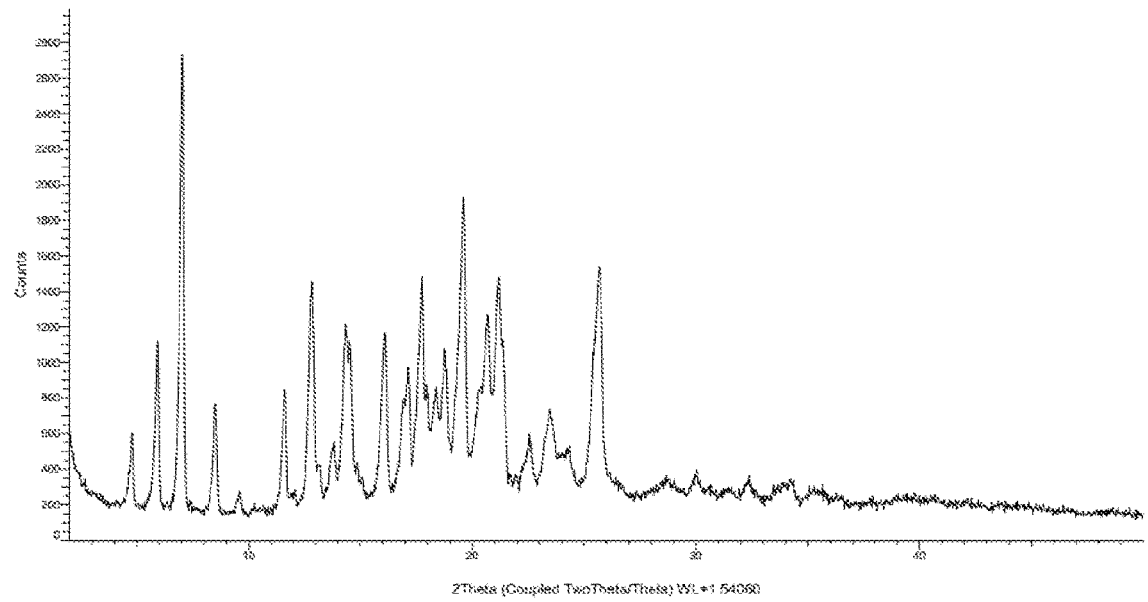
FIG. 5: Illustrates the PXRD pattern of crystalline form-N of Ribociclib succinate.

The crystalline form-N is characterized by its PXRD pattern having peaks at about 4.7°, 5.9°, 7.0°, 8.4°, 11.5°, 12.8°, 14.3°, 14.5°, 16.0°, 17.7°, 19.5°, 20.6°, 21.1° and 25.6°±0.2° of 2-theta and further characterized by its PXRD pattern as illustrated in FIG. 5.

An aspect of the third embodiment provides a process for the preparation of crystalline form-N of Ribociclib succinate comprising:
a) providing a solution of Ribociclib succinate in alcohol and optionally in mixture of ether solvent,
b) isolating crystalline form-N of Ribociclib succinate of formula-1a.

Wherein, providing the solution of Ribociclib succinate in step-a) can be done by optionally heating the mixture to a temperature ranges from about 35° C. to reflux temperature of the solvent used. Alcohol solvent in step a) is selected from methanol, ethanol, n-propanol, iso-propanol, n-butanol, iso-butanol, 2-butanol, tert-butanol, ethane-1,2-diol, propane-1,2-diol and mixtures thereof; ether solvent in step-a) is selected from dimethyl ether, diethyl ether, diisopropyl ether, methyl tert-butyl ether, 1,2-dimethoxyethane, tetrahydrofuran, 1,4-dioxane and mixtures thereof; isolating crystalline form-N in step-b) is done by removal of solvent using known techniques which are selected from distillation, decanting, filtration, cooling the mixture to lower temperatures to precipitate the solid followed by filtration of the mixture, crystallization or by adding a solvent which is different from the solvent used in step-a) selected from methyl acetate, ethyl acetate, n-propyl acetate, isopropyl acetate, n-butyl acetate, isobutyl acetate, tert-butyl acetate and mixtures thereof.

The fourth embodiment of present invention provides an acid addition salt of 7-cyclopentyl-N,N-dimethyl-2-{[5-(piperazin-1-yl)pyridin-2-yl]amino}-7H-pyrrolo [2,3-d]pyrimidine-6-carboxamide wherein the acid is selected from a group consisting of benzoic acid, fumaric acid, DL-mandelic acid, 4-hydroxybenzoic acid and salicylic acid.

In an aspect of the fourth embodiment provides a process for the preparation of an acid addition salt of 7-cyclopentyl-N,N-dimethyl-2-{[5-(piperazin-1-yl)pyridin-2-yl]amino}-7H-pyrrolo[2,3-d]pyrimidine-6-carboxamide wherein the acid is selected from a group consisting of benzoic acid, fumaric acid, DL-mandelic acid, 4-hydroxybenzoic acid and salicylic acid comprising:

a) dissolving Ribociclib of formula-1 in a solvent or mixture thereof,
b) adding an acid to the solution of step a),
c) isolating acid addition salt of compound of formula-1 from solution of step b), and
d) optionally, drying the isolated product at suitable temperature.

The solvent in step a) include, but not limited to, alcohol solvent such as methanol, ethanol, isopropanol and mixtures thereof; ketone solvent such as acetone, methyl isobutyl ketone and mixtures thereof; ether solvent such as diethyl ether, methyl tertiary butyl ether, tetrahydrofuran and mixtures thereof; ester solvent such as ethyl acetate, n-butyl acetate, isopropyl acetate and mixtures thereof; water and mixture thereof. Ribociclib may be dissolved in a solvent or mixture thereof at room temperature or by heating a suspension of Ribociclib in a solvent or mixture thereof at its boiling point. The solution may be optionally filtered to remove any un-dissolved particles.

In further aspect, the desired acid may be added to the solution of Ribociclib in a solvent or mixture thereof directly. In another aspect, a solution containing the desired acid in a solvent or mixture thereof may be added to the solution of Ribociclib in a solvent or mixture thereof. In yet another aspect, the reverse addition may also be performed wherein the solution of Ribociclib in a suitable solvent or mixture thereof may be added to the acid or a solution of acid in a suitable solvent or mixture thereof.

The mixture containing the desired acid and Ribociclib in a solvent or mixture thereof may be stirred for a period sufficient to form the desired product at a temperature between about 0° C. to about the boiling point of the solvent.

After the reaction is over, the acid addition salt of Ribociclib may be isolated from the reaction mass by any method known in the art. Specifically, the reaction mass may be cooled up to about 0° C. to about 35° C. The precipitated solid may be isolated by filtration. Optionally, the wet solid may be dried. Drying may be suitably carried out using any of an air tray dryer, vacuum tray dryer, fluidized bed dryer, spin flash dryer, flash dryer, and the like. The drying may be carried out at atmospheric pressure or above, or under reduced pressures, specifically at temperatures less than about 80° C. and more specifically less than about 60° C. The drying may be carried out for any time period required for obtaining a desired product quality, such as from about 30 minutes to about 24 hours, or longer.

Figure 6:
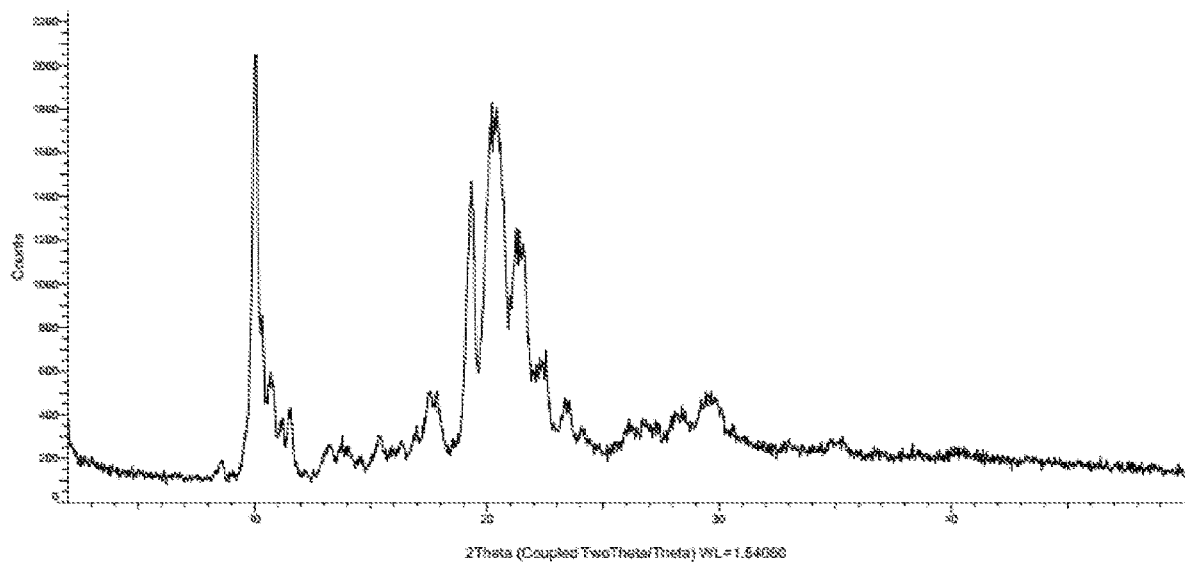
FIG. 6: Illustrates the PXRD pattern of crystalline form-M1 of Ribociclib benzoate.
Figure 7:
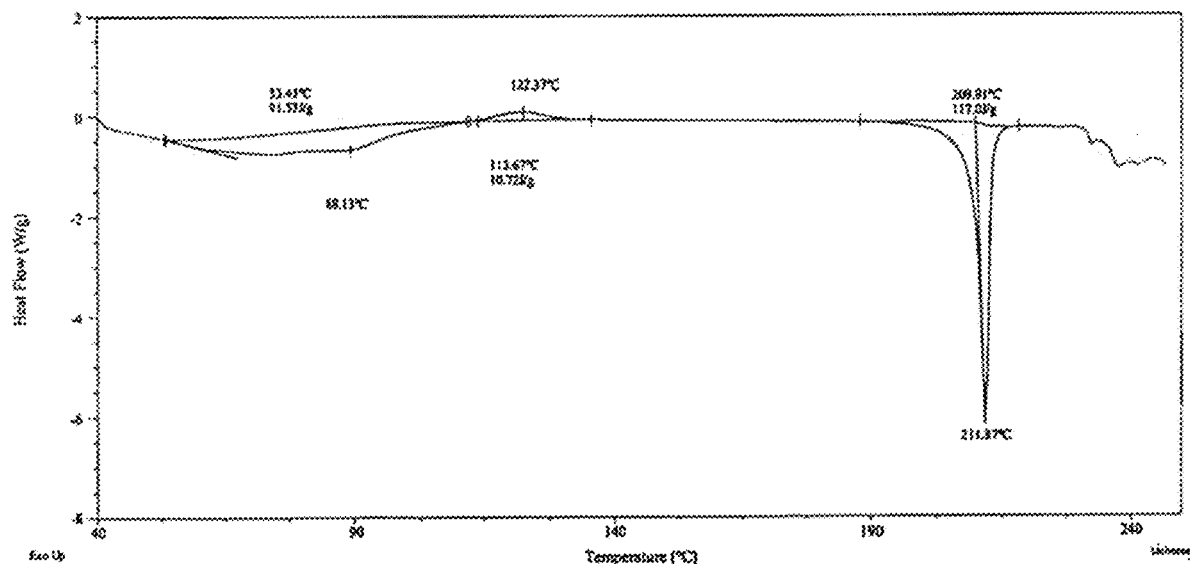
FIG. 7: Illustrates the DSC thermogram of crystalline form-M1 of Ribociclib benzoate.

In first aspect of the fourth embodiment provides crystalline Ribociclib benzoate, herein after it is designated as crystalline form-M1. The crystalline form-M1 is characterized by its PXRD pattern having peaks at about 10.0°, 19.3°, 20.4° and 21.5°±0.2° of 2-theta and further characterized by its PXRD pattern as illustrated in FIG. 6 and DSC thermogram as illustrated in FIG. 7.

Figure 8:
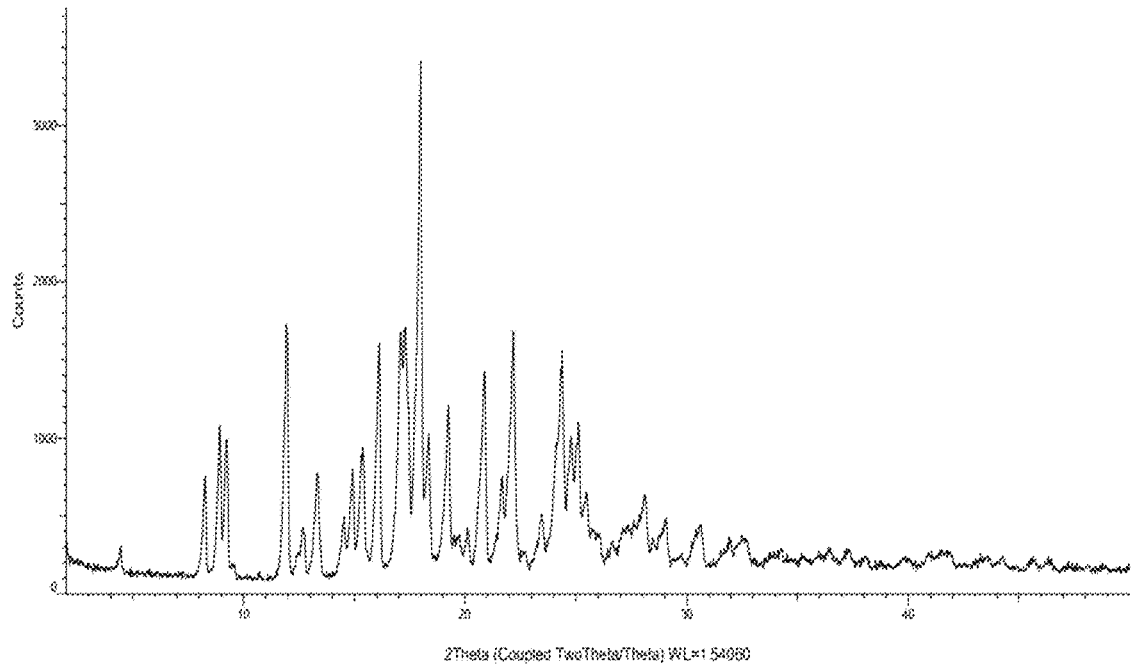
FIG. 8: Illustrates the PXRD pattern of crystalline form-M2 of Ribociclib fumarate.
Figure 9:
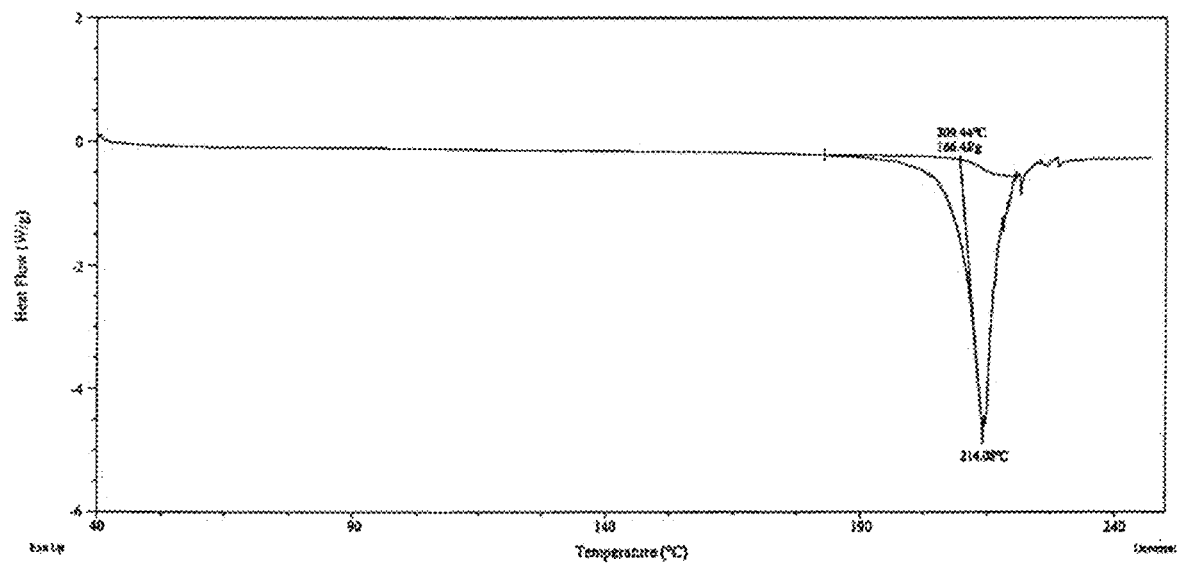
FIG. 9: Illustrates the DSC thermogram of crystalline form-M2 of Ribociclib fumarate.

In second aspect of the fourth embodiment provides crystalline Ribociclib fumarate, herein after it is designated as crystalline form-M2. The crystalline form-M2 is characterized by its PXRD pattern having peaks at about 11.9°, 16.0°, 17.9°, 20.8° and 22.1°±0.2° of 2-theta and further characterized by its PXRD pattern as illustrated in FIG. 8 and DSC thermogram as illustrated in FIG. 9.

Figure 10:
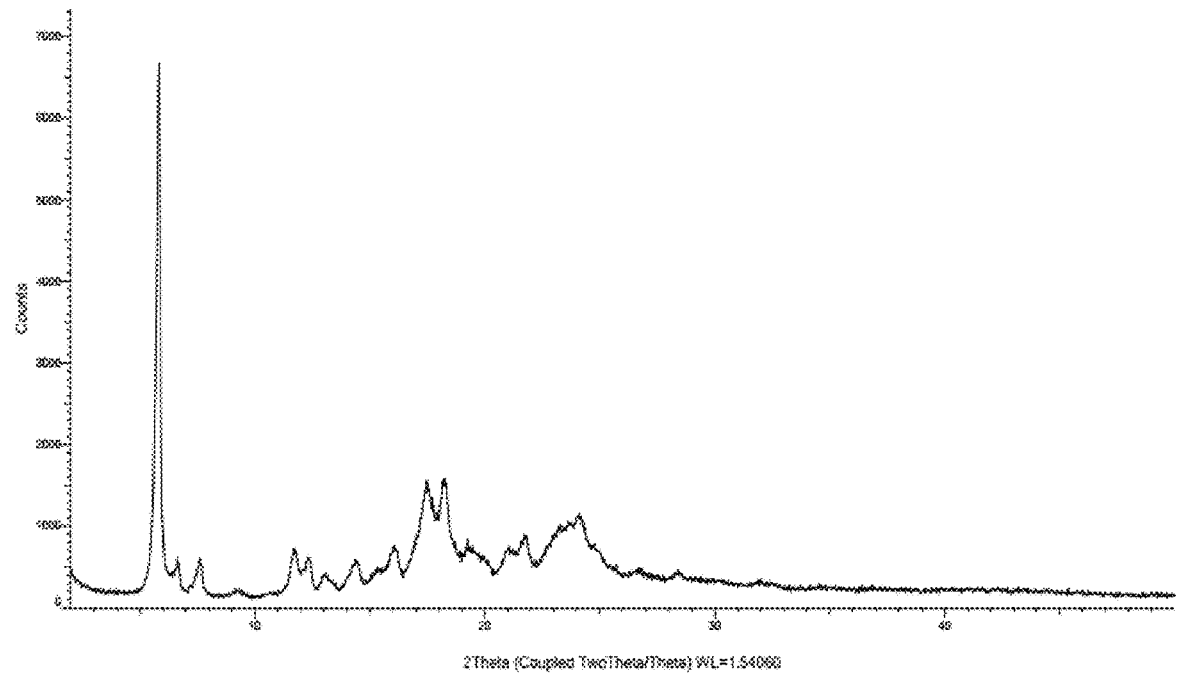
FIG. 10: Illustrates the PXRD pattern of crystalline form-M3 of Ribociclib DL-mandelate.

In third aspect of the fourth embodiment provides crystalline Ribociclib DL-mandelate, herein after it is designated as crystalline form-M3. The crystalline form-M3 is characterized by its PXRD pattern having peaks at about 5.8°, 11.7°, 17.4°, and 18.2°±0.2° of 2-theta and further characterized by its PXRD pattern as illustrated in FIG. 10.

Figure 11:
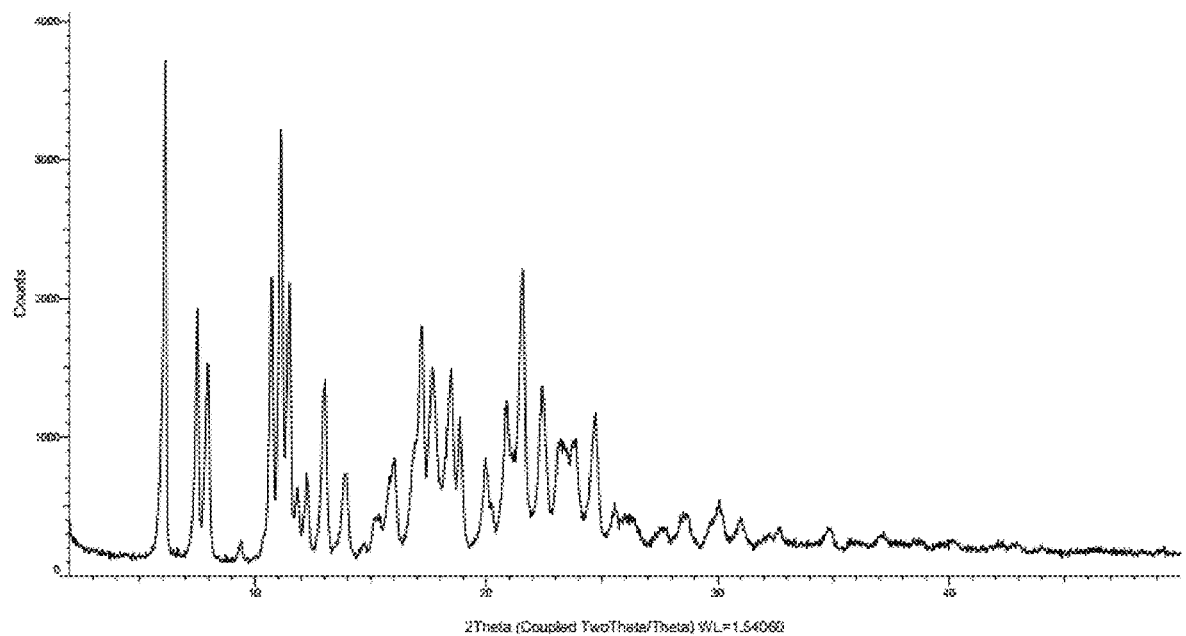
FIG. 11: Illustrates the PXRD pattern of crystalline form-M4 of Ribociclib 4-hydroxybenzoate.
Figure 12:
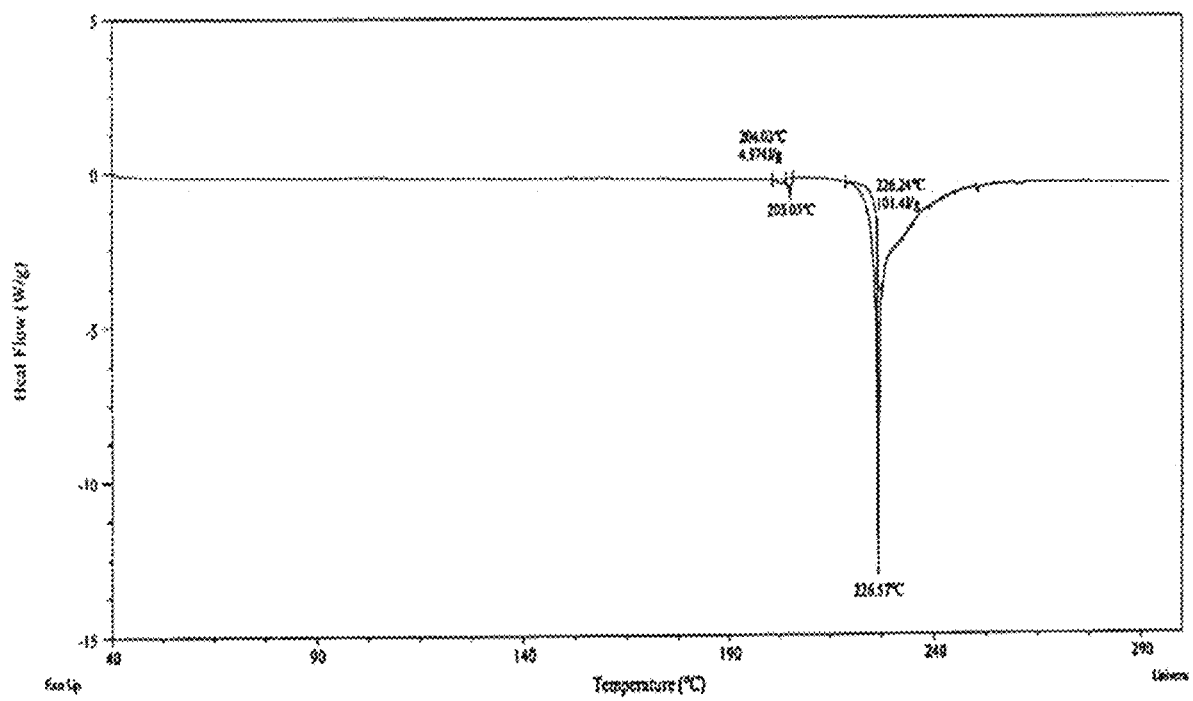
FIG. 12: Illustrates the DSC thermogram crystalline form-M4 of Ribociclib 4-hydroxybenzoate.

In fourth aspect of the fourth embodiment provides crystalline form Ribociclib 4-hydroxybenzoate, herein after it is designated as crystalline form-M4. The crystalline form-M4 is characterized by its PXRD pattern having peaks at about 6.0°, 11.10, 12.9°, 17.10 and 21.5°±0.2° of 2-theta and further characterized by its PXRD pattern as illustrated in FIG. 11 and DSC thermogram as illustrated in FIG. 12.

Figure 13:
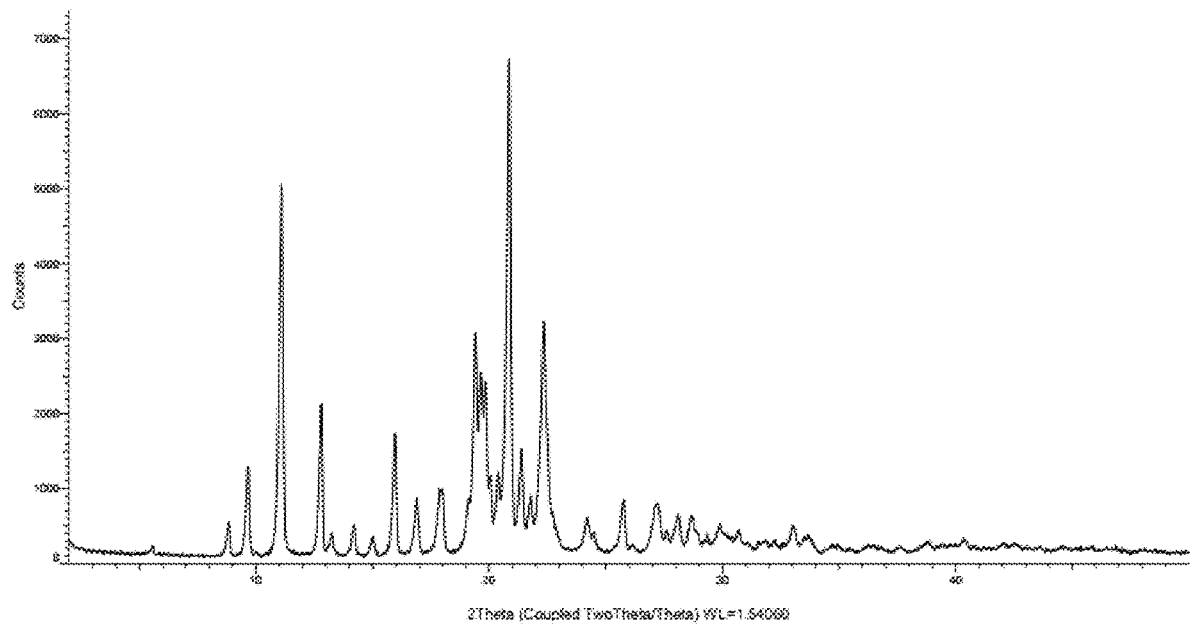
FIG. 13: Illustrates the PXRD pattern of crystalline form-M5 of Ribociclib salicylate.
Figure 14:
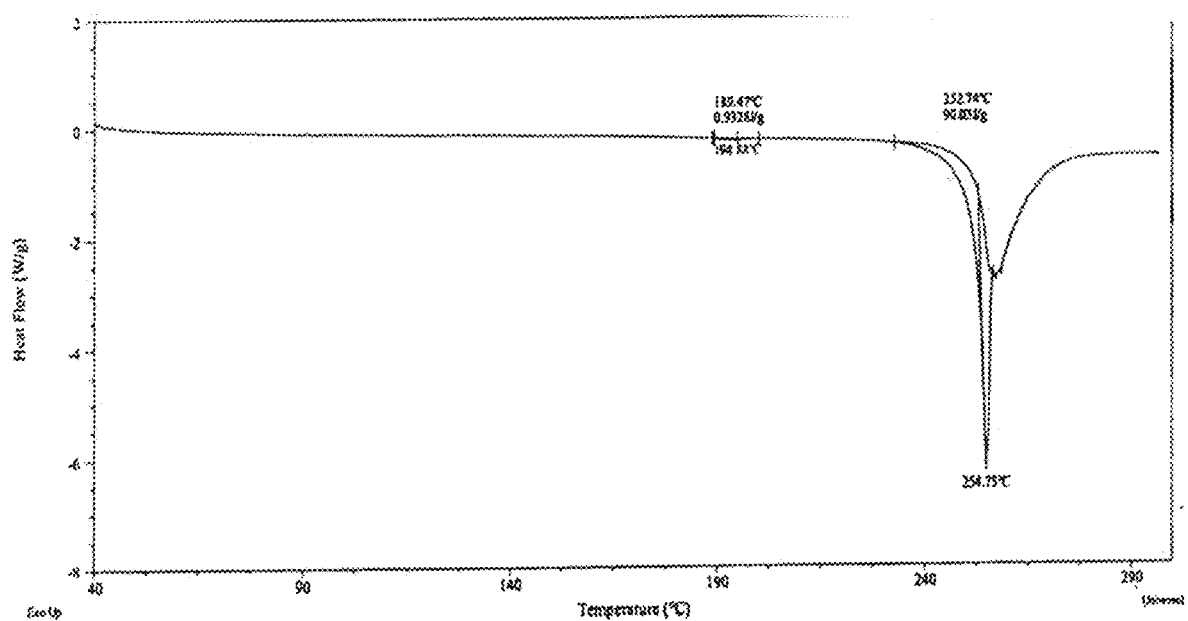
FIG. 14: Illustrates the DSC thermogram of crystalline form-M5 of Ribociclib salicylate.

In fifth aspect of the fourth embodiment provides crystalline form Ribociclib salicylate, herein after it is designated as crystalline form-M5. The crystalline form-M5 is characterized by its PXRD pattern having peaks at about 11.0°, 12.7°, 19.4°, 20.8°, and 22.3°±0.2° of 2-theta and further characterized by its PXRD pattern as illustrated in FIG. 13, DSC thermogram as illustrated in FIG. 14.

The fifth embodiment of the present invention provides novel crystalline form of Ribociclib succinate of formula-1a, herein after the said crystalline form is designated as crystalline form-N1.

Figure 15:
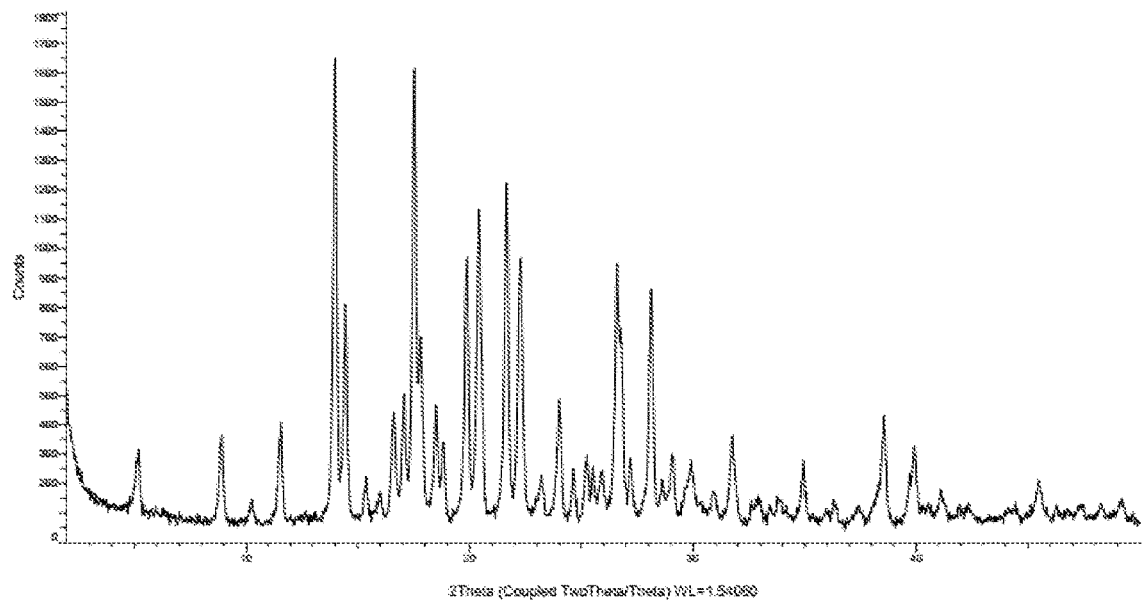
FIG. 15: Illustrates the PXRD pattern of crystalline form-N1 of Ribociclib succinate.

In the first aspect of fifth embodiment provides the crystalline form-N1 of Ribociclib succinate of formula-1a characterized by its powder X-Ray diffractogram illustrated in FIG. 15.

In the second aspect of fifth embodiment, the crystalline form-N1 of Ribociclib succinate of formula-1a comprises sodium chloride content of about 0.5% w/w or about 1% w/w or about 2% w/w or about 3% w/w or about 4% w/w or about 5% w/w or about 6% w/w or about 7% w/w or about 8% w/w or about 9% w/w or about 10% w/w or about 11% w/w or about 12% w/w or about 13% w/w or about 14% w/w or about 15% w/w or about 16% w/w or about 17% w/w or about 18% w/w or about 19% w/w or about 20% w/w or about 21% w/w or about 22% w/w or about 23% w/w or about 24% w/w or about 25% w/w or about 26% w/w or about 27% w/w or about 28% w/w or about 29% w/w or about 30% w/w.

Figure 22:
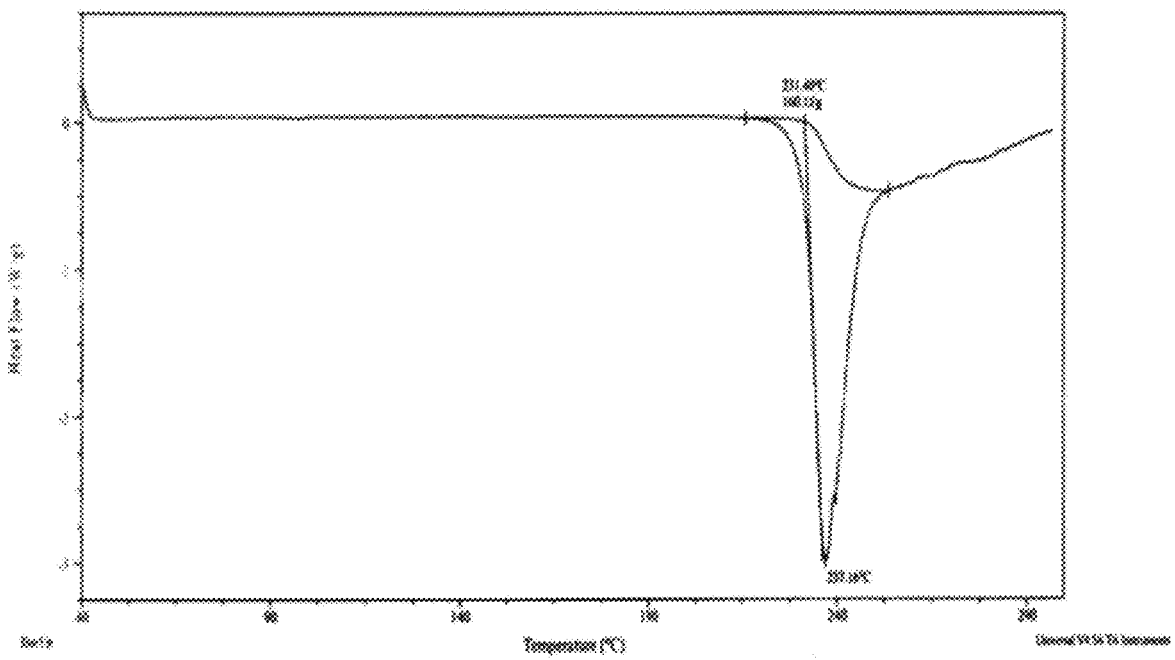
FIG. 22: Illustrates the DSC thermogram of crystalline form-N1 of Ribociclib succinate.

In the third aspect of the fifth embodiment, the crystalline Form-N1 of Ribociclib succinate of formula-1a can be characterized by one or more of the following characteristics:
  i) PXRD (powder X-Ray diffractogram) pattern having peaks at about 5.10, 11.5°, 13.9°, 17.5° and 31.7°±0.2° 2θ; or
  ii) Differential Scanning Calorimetry (DSC) having endotherm peak at about 237°±3° C.; or
  iii) Ribociclib succinate characterized by Differential Scanning Calorimetry (DSC) is illustrated in FIG. 22.

Sixth embodiment of the present invention provides process for the preparation of crystalline form-N1 of Ribociclib succinate of formula-1a, comprising:
  a) dissolving succinic acid in a solvent,
  b) adding Ribociclib of formula-1,
  c) isolating crystalline form-N1 of Ribociclib succinate of formula-1a.

Wherein, dissolving succinic acid in step-a) can be done by optionally heating the mixture to a temperature ranging from about 35° C. to reflux temperature of the solvent used. The solvent in step-a) is selected from alcohol solvents, ether solvent, ketone solvents, ester solvents or mixtures thereof; isolating crystalline form-N1 in step-c) is done by removal of solvent using known techniques which are selected from distillation, decanting, filtration, cooling the mixture to lower temperatures to precipitate the solid followed by filtration of the mixture, crystallization or by adding an anti-solvent.

In the first aspect of the sixth embodiment, step a) or step-b) optionally involve seeding with crystalline form-N1 of compound of formula-1a.

In the second aspect of the sixth embodiment, Ribociclib of formula-1 comprises sodium chloride content of about 0.5% w/w or about 1% w/w or about 2% w/w or about 3% w/w or about 4% w/w or about 5% w/w or about 6% w/w or about 7% w/w or about 8% w/w or about 9% w/w or about 10% w/w or about 11% w/w or about 12% w/w or about 13% w/w or about 14% w/w or about 15% w/w or about 16% w/w or about 17% w/w or about 18% w/w or about 19% w/w or about 20% w/w or about 21% w/w or about 22% w/w or about 23% w/w or about 24% w/w or about 25% w/w or about 26% w/w or about 27% w/w or about 28% w/w or about 29% w/w or about 30% w/w.

In the third aspect of the sixth embodiment provides Ribociclib of formula-1 having sodium chloride directly from a reaction mixture containing it by reaction or by physical blending of sodium chloride with Ribociclib compound of formula-1. The physical blending may be carried out by a process known in the art. For example, by mixing or by grinding.

The seventh embodiment of present invention provides a process for preparation of Ribociclib of formula-1 or pharmaceutically acceptable salts thereof comprising:
a) reacting 5-(4-tritylpiperazin-1-yl)pyridin-2-amine of formula-6 with 2-chloro-7-cyclopentyl-N,N-dimethyl-7H-pyrrolo[2,3-d]pyrimidine-6-carboxamide of formula-7 to provide 7-cyclopentyl-N,N-dimethyl-2-((5-(4-tritylpiperazin-1-yl)pyridin-2-yl)amino)-7H-pyrrolo[2,3-d]pyrimidine-6-carboxamide of formula-8,
b) converting 7-cyclopentyl-N,N-dimethyl-2-((5-(4-tritylpiperazin-1-yl)pyridin-2-yl)amino)-7H-pyrrolo[2,3-d]pyrimidine-6-carboxamide of formula-8 into a compound of formula-1 or its pharmaceutically acceptable salts.

The reaction in step-a) optionally carried out in presence of a coupling agent is selected from the group comprising of palladium catalysts that may be employed in this reaction include $Pd(OAc)_2$, $Pd_2(dba)_3$, or $Pd(PPh_3)_4$, and $PdCl_2(PPh_3)_2$, $(Pd(dppf)_2Cl_2)$, $[(C_6H_5CN)_2PdCl_2]$. These catalysts are typically employed with a suitable ligand, such as BINAP, Xantphos or a related phosphine-based Pd ligand bis(dibenzylideneacetone) palladium (0) [(dba)$_2$Pd], palladium chloride (PdCl$_2$), bis(benzonitrile)dichloropalladium and (Bis-(diphenylphosphinoferrocene) palladium dichloride dichloromethane complex, and the phospine compound is selected from 2,2'-bis(diphenylphosphino)-1,1'-binaphthalene (BINAP), 1,3 bis(diphenyl-phosphino)propane, triphenylphosphine (Ph$_3$P), triorthotolylphosphine [(o-CH$_3$Ph)$_3$ P] and tri-t-butylphosphine] or bis(trimethylsilyl) amide salt of sodium, potassium and lithium base or Grignard reagent such as $C_{1-6}$ alkyl magnesium halides or cycloalkyl magnesium halides or in the presence of base selected from an inorganic or organic bases.

The conversion in step-b) optionally carried out in presence of acid can be selected from but not limited to "inorganic acids" such as hydrochloric acid, hydrobromic acid, sulfuric acid, nitric acid and phosphoric acid; and "organic acids" such as formic acid, acetic acid, propionic acid, butyric acid, valeric acid, caproic acid, trifluoroacetic acid, trifluoromethanesulfonic acid, oxalic acid, malonic acid, maleic acid, fumaric acid, malic acid, succinic acid, citric acid, aspartic acid, tartaric acid, mandelic acid, benzoic acid, salicylic acid, substituted/unsubstituted alkyl/aryl sulfonic acids such as methanesulfonic acid, ethanesulfonic acid, propanesulfonic acid, benzenesulfonic acid, p-toluenesulfonic acid, naphthalenesulfonic acid and the like.

The step a) and/or step b) is optionally carried out in a solvent selected from water, alcohol solvents, chloro solvents, ether solvents, ester solvents, polar aprotic solvents, hydrocarbon solvents, ketone solvents and polar solvents or mixtures thereof.

Eighth embodiment of present invention provides 5-(4-tritylpiperazin-1-yl)pyridin-2-amine of formula-6, which is a useful intermediate in the preparation of Ribociclib or its pharmaceutically acceptable salt.

In the first aspect of the eighth embodiment, the compound of formula-6 can be isolated in a solid state form.

In the second aspect of the eighth embodiment provides crystalline 5-(4-trityl piperazin-1-yl)pyridin-2-amine of formula-6; herein after designated as crystalline Form-M.

Figure 16:
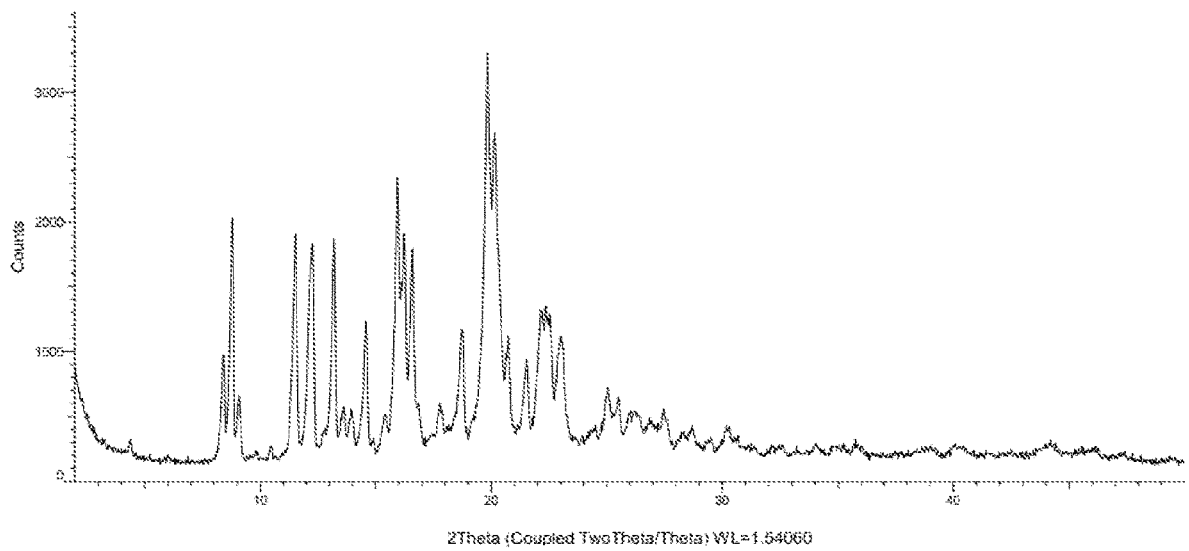
FIG. 16: Illustrates the PXRD pattern of crystalline form-M the compound of formula-6.

Further, the crystalline Form-M of compound of formula-6 can be characterized by one or more of the following characteristics:
i) XRPD pattern having peaks at about 8.7, 11.4, 12.2, 13.2, 14.5, 16.0, 18.6, 19.8 and 22.1° 2θ±0.2° 2θ; or
ii) XRPD pattern as depicted in FIG. 16.

In the third aspect of the eighth embodiment provides another crystalline 5-(4-tritylpiperazin-1-yl)pyridin-2-amine compound of formula-6; herein after designated as crystalline Form-M1.

Figure 19:
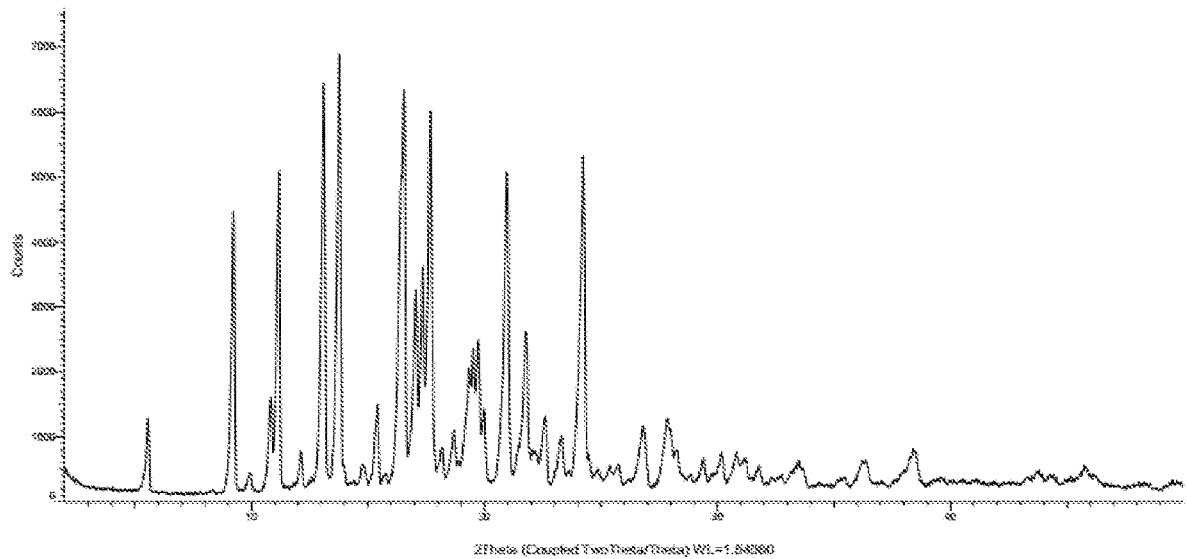
FIG. 19: Illustrates the PXRD pattern of crystalline Form-M1 of the compound of formula-6.

Further, the crystalline Form-M1 of compound of formula-6 can be characterized by one or more of the following characteristics:
i) XRPD pattern having peaks at about 9.2, 11.1, 13.1, 13.7, 16.5, 17.6 and 20.9° 2θ±0.2° 2θ; or
ii) XRPD pattern as depicted in FIG. 19.

Ninth embodiment of the present invention provides a process for the preparation of 5-(4-tritylpiperazin-1-yl)pyridin-2-amine of formula-6 comprising:
a) reacting the compound of formula-4 with trityl chloride in a solvent in presence of a base to provide 1-(6-nitropyridin-3-yl)-4-tritylpiperazine compound of formula-5,
b) reduction of compound of formula-5 using reducing agent in a solvent to provide 5-(4-tritylpiperazin-1-yl)pyridin-2-amine compound of formula-6,
c) optionally purifying the compound obtained in step-a) to get the pure 5-(4-tritylpiperazin-1-yl)pyridin-2-amine compound of formula-6.

Reducing agent in step-b) is selected from a group comprising of Fe, Fe in acidic media like NH$_4$Cl or HCl or acetic acid, Sn in acidic media like HCl, Zn, Zn in acidic media like HCl or NH$_4$Cl or acetic acid, sodium borohydride with catalytic NiCl$_2$·6H$_2$O or CoCl$_2$·6H$_2$O, Lithium borohydride, diborane, Sodium aluminium hydride, hydrazine hydrate, sodium dithionate, sodium sulfide, ammonium sulfide, hydrogenation catalysts such as nickel, Raney nickel, rhodium, Pd/C or combined with borohydrides, cyclohexene, acidic media like formic acid, H$_3$PO$_2$ etc., Raney cobalt, Raney iron, lithium aluminum hydride, sodium amalgam, platinum oxide, borane-tetrahydrofuran complex and the like in combination with hydrogen, trialkyl silane and the like; base used in step-a) is selected from organic or inorganic bases; solvent used in steps-a) to b) is selected from alcohol solvents, chloro solvents, ether solvents, ester solvents, polar aprotic solvents, hydrocarbon solvents, ketone solvents and polar solvents or mixtures thereof; In an aspect of the ninth embodiment, the compound of formula-6 is further converted into compound of formula-1 or its pharmaceutically acceptable salts.

Tenth embodiment of present invention provides 7-cyclopentyl-N,N-dimethyl-2-((5-(4-tritylpiperazin-1-yl)pyridine-2-yl)amino)-7H-pyrrolo[2,3-d]pyrimidine-6-carboxamide compound of formula-8, which is a useful intermediate in the preparation of Ribociclib or its pharmaceutically acceptable salt.

In the first aspect of the tenth embodiment, the compound of formula-8 can be isolated in solid state form.

In the second aspect of the tenth embodiment provides crystalline form of 7-cyclopentyl-N,N-dimethyl-2-((5-(4-tritylpiperazin-1-yl) pyridine-2-yl)amino)-7H-pyrrolo [2,3-d] pyrimidine-6-carboxamide compound of formula-8; herein after designated as Form-N.

Figure 18:
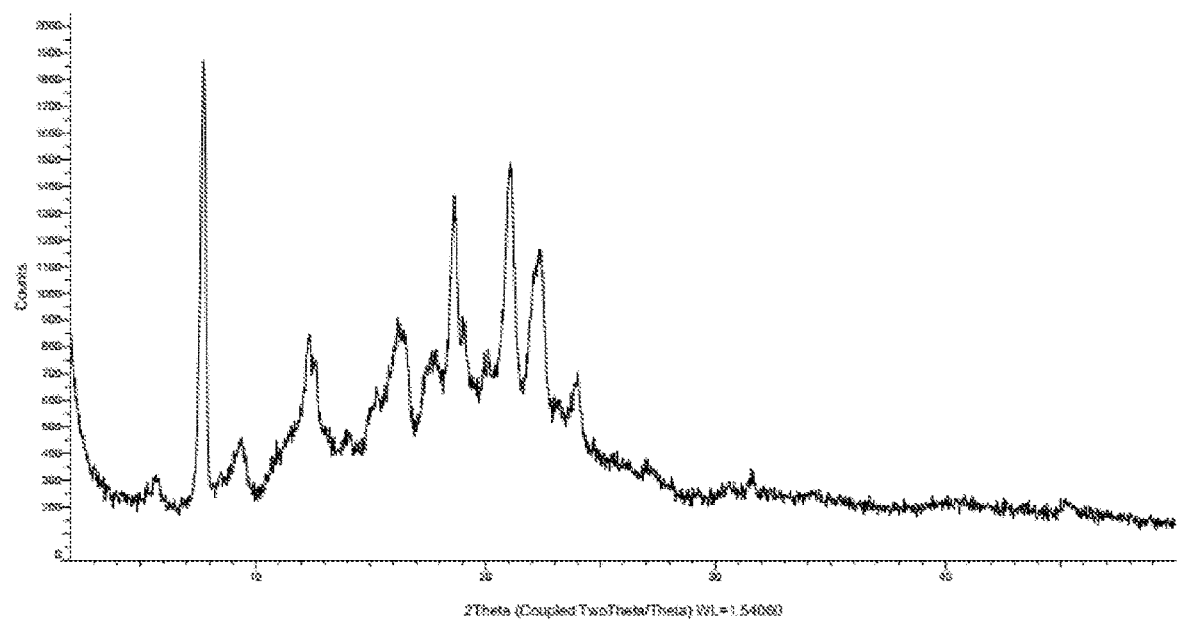
FIG. 18: Illustrates the PXRD pattern of crystalline form-N of the compound of formula-8.

Further, the crystalline Form-N of compound of formula-8 can be characterized by one or more of the following characteristics:

i) XRPD pattern having peaks at about 7.7, 12.4, 18.6, 21.1 and 22.3°±0.2° 2θ; or
ii) XRPD pattern as depicted in FIG. 18.

In the third aspect of the tenth embodiment provides another crystalline form of 7-cyclopentyl-N,N-dimethyl-2-((5-(4-tritylpiperazin-1-yl)pyridine-2-yl)amino)-7H-pyrrolo [2,3-d]pyrimidine-6-carboxamide compound of formula-8; herein after designated as Form-N1.

Figure 20:
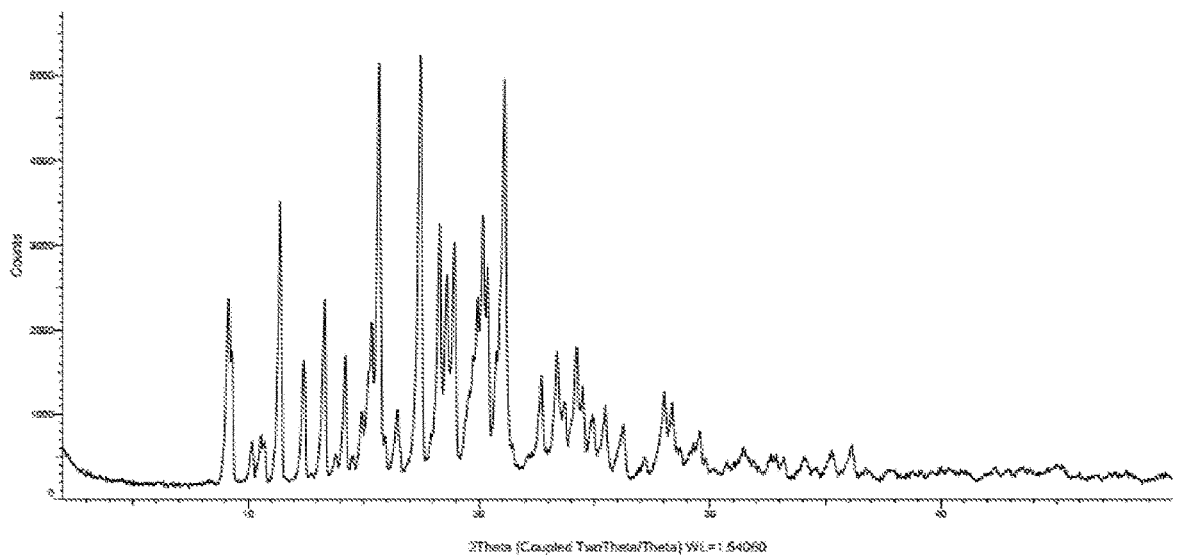
FIG. 20: Illustrates the PXRD pattern of crystalline form-N1 of the compound of formula-8.

Further, the crystalline Form-N1 of compound of formula-8 can be characterized by one or more of the following characteristics:

i) XRPD pattern having peaks at about 9.1, 11.3, 15.6, 17.4 and 21.0°±0.2° 2θ; or
ii) XRPD pattern as depicted in FIG. 20.

Eleventh embodiment of the present invention provides a process for the preparation of 7-cyclopentyl-N,N-dimethyl-2-((5-(4-tritylpiperazin-1-yl) pyridine-2-yl)amino)-7H-pyrrolo[2,3-d]pyrimidine-6-carboxamide compound of formula-8 comprises reacting 5-(4-tritylpiperazin-1-yl)pyridin-2-amine compound of formula-6 with 2-chloro-7-cyclopentyl-N,N-dimethyl-7H-pyrrolo[2,3-d]pyrimidine-6-carboxamide compound of formula-7 in presence of a coupling agent in a solvent to provide 7-cyclopentyl-N,N-dimethyl-2-((5-(4-tritylpiperazin-1-yl)pyridin-2-yl)amino)-7H-pyrrolo[2,3-d]pyrimidine-6-carboxamide compound of formula-8.

Coupling agent is selected from the group comprising of palladium catalysts that may be employed in this reaction include $Pd(OAc)_2$, $Pd_2(dba)_3$, or $Pd(PPh_3)_4$, and $PdCl_2(PPh_3)_2$, $(Pd(dppf)_2Cl_2)$, $[(C_6H_5CN)_2PdCl_2]$. These catalysts are typically employed with a suitable ligand, such as BINAP, Xantphos or a related phosphine-based Pd ligand bis(dibenzylideneacetone) palladium (0) [$(dba)_2Pd$], palladium chloride ($PdCl_2$), bis(benzonitrile)dichloropalladium and (Bis-(diphenylphosphinoferrocene) palladium dichloride dichloromethane complex, and the phospine compound is selected from 2,2'-bis(diphenylphosphino)-1,1'-binaphthalene (BINAP), 1,3 bis(diphenyl-phosphino)propane, triphenylphosphine ($Ph_3P$), triorthotolylphosphine [$(o-CH_3Ph)_3P$] and tri-t-butylphosphine] or bis(trimethylsilyl)amide salt of sodium, potassium and lithium base or Grignard reagent such as $C_{1-6}$ alkyl magnesium halides or cycloalkyl magnesium halides or in the presence of base selected from an inorganic or organic bases; solvent is selected from alcohol solvents, chloro solvents, ether solvents, ester solvents, polar aprotic solvents, hydrocarbon solvents, ketone solvents and polar solvents or mixtures thereof.

In an aspect of the eleventh embodiment 7-cyclopentyl-N,N-dimethyl-2-((5-(4-tritylpiperazin-1-yl)pyridine-2-yl) amino)-7H-pyrrolo[2,3-d]pyrimidine-6-carboxamide compound of formula-8 is converted into a compound of formula-1 or its pharmaceutically acceptable salts.

Schematic Representation for the Synthesis of Formula-1:

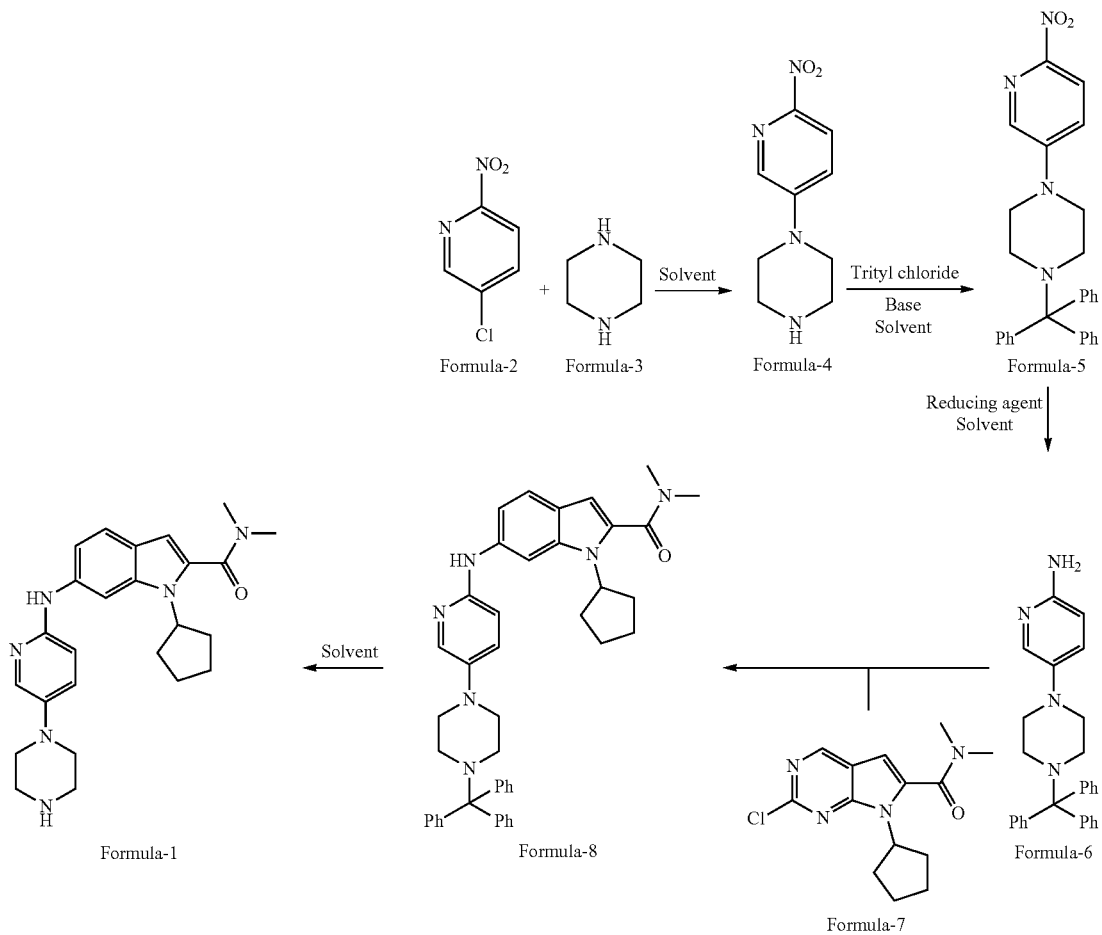

Ribociclib of formula-1 used in the present invention is prepared by any of the known processes disclosed in the literature like U.S. Pat. No. 8,415,355 or 9,193,732 or prepared by a process of the present application.

The acid addition salts of compound of formula-1 of the present invention are useful for the preparation of pure compound of formula-1 and also useful for the preparation of compound of formula-1a and its polymorphs.

An embodiment of the present invention provides the use of acid addition salts of formula-1, compound of formula-1a and their polymorphs of the present invention for the preparation of various pharmaceutical formulations.

The another embodiment of the present invention provides pharmaceutical composition comprising acid addition salts of formula-1, compound of formula-1a and their polymorphs or mixture thereof and at least one pharmaceutically acceptable excipient. As used herein, the term "pharmaceutical compositions" or "pharmaceutical formulations" include tablets, pills, powders, liquids, suspensions, emulsions, granules, capsules, suppositories, or injection preparations.

Ribociclib of formula-1 or its pharmaceutically acceptable salts and their polymorphs produced by various processes of the present invention and one or more pharmaceutically acceptable carriers for the treatment of postmenopausal women with hormone receptor (HR)-positive, human epidermal growth factor receptor 2 (HER2)-negative advanced or metastatic breast cancer.

The compound of formula-1 and its pharmaceutically acceptable salts produced by various processes of the present invention is having purity of greater than about 99%, preferably greater than about 99.5%, more preferably greater than about 99.7%, most preferably greater than about 99.8% by HPLC {High Performance Liquid Chromatography}.

HPLC method of analysis for the compound of formula-1 or its pharmaceutically acceptable salts of the present invention can be carried out by known techniques.

PXRD Method of Analysis:

The PXRD analysis of compounds of the present invention was carried out by using BRUKER/D8 ADVANCE X-Ray diffractometer using CuKα radiation of wavelength 1.5406 A° and at a continuous scan speed of 0.03°/min.

The compound of formula-1, acid addition salts of compound of formula-1 and the compound of formula-1a produced by the processes of the present invention can be further micronized or milled to get desired particle size to achieve desired solubility profile based on different forms of pharmaceutical composition requirements. Techniques that may be used for particle size reduction includes but not limited to single or multi-stage micronization using cutting mills, pin/cage mills, hammer mills, jet mills, fluidized bed jet mills, ball mills and roller mills. Milling or micronization may be performed before drying or after drying of the product.

Ribociclib Succinate of formula-1a obtained according to the present invention has particle size of less than about 250 m or less than about 200 m or less than about 150 m or less than about 100 m or less than about 50 m or any other suitable particle sizes.

The best mode of carrying out the present invention was illustrated by the below mentioned examples. These examples are provided as illustration only and hence should not be construed as limitation to the scope of the invention.

EXAMPLES

Example-1: Preparation of Crystalline Form-M of Ribociclib Succinate of Formula-1a Dissolved Ribociclib of formula-1 (1 g), in the mixture of tetrahydrofuran (50 ml) and ethanol (50 ml) at 60-65° C. Succinic acid (400 mg) was added to the obtained solution and stirred for 30 minutes at the same temperature. This mixture was added to pre-cooled isopropyl acetate (250 ml) at −50° C. to −55° C. and stirred the mixture. Raised the temperature of the mixture to 25° C.-30° C. and stirred for 90 minutes at the same temperature. Filtered the precipitated solid and dried to get the title compound.

Yield: 1.10 g. PXRD of the obtained compound is illustrated in FIG. 1, DSC thermogram of obtained compound illustrated in FIG. 2, water content by KF 1.38% (w/w), succinic acid content 19.94 and purity: 99.70% by HPLC.

Example-2: Preparation of Crystalline Form-M of Ribociclib Succinate of Formula-1a Dissolved Ribociclib of formula-1 (250 mg) in 2-butanol (10 ml) at 50-55° C. Succinic acid (100 mg) was added to the obtained solution and stirred for 2 hours at the same temperature. Filtered the solid and dried to get the title compound.

Yield: 260 mg.

Example-3: Preparation of Crystalline Form-M of Ribociclib Succinate of Formula-1a Mixture of Ribociclib of formula-1 (250 mg), ethylacetate (10 ml) and succinic acid (100 mg) at 25-30° C. were stirred for 2 hours at the same temperature. Filtered the solid and dried to get the title compound.

Yield: 210 mg.

Example-4: Preparation of Crystalline Form-M of Ribociclib Succinate of Formula-1a Mixture of Ribociclib of formula-1 (250 mg), isoamylalcohol (10 ml) and succinic acid (100 mg) was stirred for 1 hour at 25-30° C. Filtered the solid and dried to get the title compound.

Yield: 180 mg.

Example-5: Preparation of Crystalline Form-M of Ribociclib Succinate of Formula-1a Succinic acid (200 mg) is dissolved in isobutyl alcohol (20 ml) at 50-55° C. and cooled to 25-30° C. Ribociclib of formula-1 (500 mg) is added to this obtained solution at 25-30° C. and stirred for 1 hour at the same temperature. Filtered the solid and dried to get the title compound. Yield: 500 mg.

Example-6: Preparation of Crystalline Form-S of Ribociclib Succinate of Formula-1a Mixture of Ribociclib succinate of formula-1a (7 g) and 1,4-dioxane (300 ml) at 25-30° C. was heated to 50-55° C.

and stirred for 12 hours at the same temperature. Filtered the solid and dried the solid to afford the title compound.

Yield: 9.4 g.

PXRD of the obtained compound is illustrated in FIG. 3 and DSC thermogram of obtained compound illustrated in FIG. 4.

Example-7: Preparation of Crystalline Form-N of Ribociclib Succinate of Formula-1a Dissolved Ribociclib succinate of formula-1a (2.5 g) in the mixture of tetrahydrofuran (100 ml) and methanol (100 ml) at 60-65° C. The solution was added to pre-cooled methyl tertiary butyl ether (400 ml) at 0-5° C. and stirred for 15 minutes at the same temperature. Filtered the precipitated solid, washed with mixture of methyl tertiary butyl ether and dried the solid to afford the title compound.

Yield: 2 g. PXRD of the obtained compound is illustrated in FIG. 5.

Example-8: Preparation of Ribociclib Benzoate

Mixture of Ribociclib (2 g) and isopropanol (120 ml) was heated to 75-80° C. and stirred for 5 minutes at the same temperature. Solution of benzoic acid (0.68 g) in isopropanol (16 ml) was added to the above mixture at 75° C.-80° C. and stirred for 10 minutes at the same temperature. Cooled the mixture to 25° C.-30° C. and stirred for 30 minutes at the same temperature. Filtered the solid, washed with isopropanol and dried to get the title compound.

Yield: 2.0 g. PXRD of the obtained compound is illustrated in FIG. 6, DSC thermogram of obtained compound illustrated in FIG. 7.

Example 9: Preparation of Ribociclib Fumarate

Dissolved Ribociclib (2 g) in isopropanol (120 ml) at 75-80° C. Filtered the solution through hyflow and washed with isopropanol. The obtained filtrate was heated to 75-80° C. Solution of fumaric acid (0.64 g) in isopropanol (16 ml) was added to the above solution at 75-80° C. and stirred for 10 minutes at the same temperature. Cooled the mixture to 0-5° C. and stirred for 1 hour at the same temperature. Filtered the solid, washed with isopropanol and dried to get the title compound.

Yield: 2.0 g. PXRD of the obtained compound is illustrated in FIG. 8, DSC thermogram of obtained compound illustrated in FIG. 9.

Example 10: Preparation of Ribociclib Dl-Mandalate

Dissolved Ribociclib (2 g) in isopropanol (120 ml) at 75-80° C. Filtered the solution through hyflow and washed with isopropanol. The obtained filtrate was heated to 75-80° C. Solution of dl-mandelic acid (0.84 g) in isopropanol (16 ml) was added the above solution at 75-80° C. and stirred for 10 minutes at the same temperature. Cooled the mixture to 0-5° C. and stirred for 1 hour at the same temperature. Filtered the solid, washed with isopropanol and dried to get the titled compound.

Yield: 2.2 g. PXRD of the obtained compound is illustrated in FIG. 10.

Example 11: Preparation of Ribociclib 4-Hydroxybenzoate

Dissolved Ribociclib (2 g) in isopropanol (120 ml) at 75-80° C. Filtered the solution through hyflow and washed with isopropanol. The obtained filtrate was heated to 75-80° C. 4-hydroxy benzoic acid (0.76 g) was added to it at 75-80° C. and stirred for 10 minutes at the same temperature. Cooled the mixture to 0-5° C. and stirred for 1 hour at the same temperature. Filtered the solid, washed with isopropanol and dried to get the titled compound.

Yield: 2.0 g. PXRD of the obtained compound is illustrated in FIG. 11 and DSC thermogram as illustrated in FIG. 12.

Example 12: Preparation of Ribociclib Salicylate

Dissolved Ribociclib (2 g) in isopropanol (120 ml) at 75-80° C. Filtered the solution through hyflow and washed with isopropanol. The obtained filtrate was heated to 75-80° C. Salicylic acid (0.76 g) was added to it at 75-80° C. and stirred for 10 minutes at the same temperature. Cooled the mixture to 0-5° C. and stirred for 1 hour at the same temperature. Filtered the solid, washed with isopropanol and dried to get the title compound.

Yield: 2.2 g. PXRD of the obtained compound is illustrated in FIG. 13 and DSC thermogram of obtained compound illustrated in FIG. 14.

Example-13: Preparation of tert-butyl 4-(6-((7-cyclopentyl-6-(dimethyl carbamoyl)-7H-pyrrolo[2,3-d]pyrimidin-2-yl)amino)pyridin-3-yl)piperazine-1-carboxylate The mixture of tert-butyl 4-(6-aminopyridin-3-yl)piperazine-1-carboxylate (199.7 g), 2-chloro-7-cyclopentyl-N,N-dimethyl-7H-pyrrolo[2,3-d]pyrimidine-6-carboxamide (200 g) and tetrahydrofuran (1.4 it) was cooled to 0-5° C. Sodium hexamethyldisilazide (1100 ml) was added to the reaction mixture at 0-5° C. and stirred for 1 hour at the same temperature. The reaction mixture was quenched with aqueous ammonium chloride solution, raised the temperature of the reaction mixture to 25-30° C. and ethyl acetate was added to it. Separated both the organic and aqueous layers and aqueous layer was extracted with dichloromethane. Combined the organic layers, distilled off the solvent from the organic layer and co-distilled with acetone. Acetone (800 ml) was added to the obtained compound and stirred the mixture at the same temperature. Filtered the solid and dried to get the title compound.

Yield: 326.0 g.

Example-14: Preparation of Ribociclib of Formula-1

The mixture of tert-butyl 4-(6-((7-cyclopentyl-6-(dimethylcarbamoyl)-7H-pyrrolo [2,3-d]pyrimidin-2-yl)amino)pyridin-3-yl)piperazine-1-carboxylate (300 g) and toluene (1500 ml) was cooled to 0-5° C. Aqueous hydrochloride solution was added to the mixture at 0-5° C. and stirred for 1 hour at the same temperature. Separated both the organic and aqueous layers. The aqueous layer was washed with ethyl acetate and cyclohexane. Basifying the aqueous layer by using aqueous sodium hydroxide solution. Filtered the solid, washed with water and dried to get the title compound.

Yield: 241 g; purity by HPLC: 99.79%. Sodium chloride content: 11.9% w/w.

Example-15: Preparation of Crystalline Form-N1 of Ribociclib Succinate of Formula-1a The compound of formula-1 which is having sodium chloride content of 11.9% w/w (5 g) was added to solution of succinic acid (1.63 g) in a mixture of tetrahydrofuran (125 ml) and acetone (125 ml) at 25-30° C. and stirred for 7 hours at the same temperature. Filtered the solid and dried to get the title compound.

Yield: 4.9 g; purity by HPLC: 99.75%; Water content by KF: 0.68%; PXRD of the obtained compound is illustrated in FIG. 15. Sodium chloride content: 15% w/w.

Example-16: Preparation of Crystalline Form-N1 of Ribociclib Succinate of Formula-1a The compound of formula-1 (500 mg) was ground with 75 mg of sodium chloride at 25-30° C. The obtained compound was added to the solution of succinic acid (160 mg) in a mixture of tetrahydrofuran (12.5 ml) and acetone (12.5 ml) at 25-30° C. Stirred the mixture for 7 hours at the same temperature. Filtered the solid and dried to get the title compound.

Yield: 450 mg. PXRD of the obtained compound is similar to the FIG. 15.

Example-17: Preparation of 1-(6-nitropyridin-3-yl)-piperazine

A mixture of piperazine (109 g), 2-nitro-5-chloropyridine (100 g) and iso-propanol (1500 ml) was heated to 80-85° C. and stirred for 24 hours at the same temperature. Cooled the reaction mixture 25-30° C. and stirred for 2 hours at the same temperature. Filtered the solid and washed with iso-propanol. Water (500 ml) was added to the obtained compound at 25-30° C. and cooled to 0-5° C. Basified the mixture using aqueous sodium carbonate solution at 0-5° C. and stirred for 2 hours at the same temperature. Filtered solid, washed with water and dried to get title compound. Yield: 102.2 g.

Example-18: Preparation of 1-(6-nitropyridin-3-yl)-piperazine

A mixture of piperazine (32.6 g), 2-nitro-5-chloropyridine (10 g) and iso-propanol (50 ml) was heated to 80-85° C. and stirred for 4 hours at the same temperature. Cooled the reaction mixture 25-30° C. and stirred for 2 hours at the same temperature. Filtered the solid and washed with iso-propanol. Water was added to the obtained compound at 25-30° C. and cooled to 0-5° C. Basified the mixture using aqueous sodium carbonate solution at 0-5° C. and stirred for 2 hours at the same temperature. Filtered solid, washed with water and dried to get title compound.

Yield: 10.3 g. M.R.: 145.2° C. to 148.3° C.

Example-19: Preparation of 1-(6-nitropyridin-3-yl)-4-tritylpiperazine

Trityl chloride (50 g) was slowly added to mixture of 1-(6-nitropyridin-3-yl)piperazine (25 g), triethylamine (42 ml) and dichloromethane (250 ml) at 25-30° C. and stirred for 20 hours at 25-30° C. Reaction was quenched with water at 25-30° C. and stirred for 30 minutes at same temperature. Filtered reaction mixture through hy-flow bed and washed with dichloromethane. Separated both organic and aqueous layers and the aqueous layer was extracted with dichloromethane. Combined the organic layers and washed with aqueous sodium chloride solution. Distilled off solvent completely from organic layer and cooled the residue to 25-30° C. To this obtained residue methyl tertiary butyl ether (125 ml) was added at 25-30° C. and stirred for 2 hours at the same temperature. Filtered the solid, washed with methyl tertiary butyl ether and dried to get titled compound.

Yield: 45 g

Example-20: Preparation of 1-(6-nitropyridin-3-yl)-4-tritylpiperazine

Mixture of trityl chloride (160 g), 1-(6-nitropyridin-3-yl) piperazine (100 g), dimethyl formamide (600 ml) and sodium carbonate (127 g) was stirred for 10 hours at 10-15° C. and water was added to it. Stirred the mixture for 2 hours at 10-15° C. Filtered solid, washed with water and dried to get the title compound.

Yield: 210 g

Example-21: Preparation of 1-(6-nitropyridin-3-yl)-4-tritylpiperazine

Mixture of trityl chloride (12.9 g), 1-(6-nitropyridin-3-yl) piperazine (8 g), dimethyl formamide (48 ml) and sodium carbonate (10.2 g) was stirred for 10 hours at 10-15° C. and water was added to it. Stirred the mixture for 2 hours at 10-15° C. Filtered solid, washed with water and dried. The obtained compound was slurried with methyl tertiary butyl ether (120 ml), filtered and dried to get title compound.

Yield: 14.6 g

Example-22: Preparation of 1-(6-nitropyridin-3-yl)-4-tritylpiperazine

Sodium carbonate (299 g) was added slowly to the mixture of trityl chloride (313 g), 1-(6-nitropyridin-3-yl) piperazine (195 g), dimethyl formamide (1170 ml) at 10-15° C., raised the temperature to 25-30° C. and stirred for 15 hours at the same temperature. Cooled the reaction mixture 5-10° C., water was added to it and stirred at the same temperature. Filtered solid, washed with water. The obtained compound was slurried in water and followed by in methyl tertiary butyl ether to get title compound.

Yield: 320 g; M.R: 205-208° C. Purity by HPLC: 94.07%.

Example-23: Preparation of 5-(4-tritylpiperazin-1-yl)pyridin-2-amine

A mixture of 1-(6-nitropyridin-3-yl)-4-tritylpiperazine (100 g), methanol (1000 ml) and 5% palladium carbon (3 g) was taken in an autoclave and stirred for 10 minutes at 25-30° C. 4.0-5.0 Kg/cm2 of hydrogen gas was applied to the above mixture at 25-30° C. and stirred for 16 hours at the same temperature. Dichloromethane was added to reaction mixture at 25-30° C. and stirred for 15 minutes at the same temperature. Filtered the resultant mixture through a hyflow bed and washed with dichloromethane and methanol. Distilled off solvent completely from the filtrate. Methanol was added to the obtained compound at 25-30° C. and stirred for 2 hours at the same temperature. Filtered the solid, washed with methanol and dried to get the title compound.

Yield: 65 g; PXRD pattern of the obtained compound is illustrated in FIG. 16.

Example-24: Preparation of 5-(4-tritylpiperazin-1-yl)pyridin-2-amine 1-(6-nitropyridin-3-yl)-4-tritylpiperazine (300 g) and tetrahydrofuran (3 Lit) were taken into an autoclave and 5% of palladium carbon (30 g) was added to the solution at 25-30° C. Applied hydrogen pressure to the above reaction mixture at 25-30° C. and stirred for 7 hours at the same temperature. Filtered the resultant mixture through hyflow bed and washed with tetrahydrofuran. Distilled off solvent completely from the filtrate and co-distilled with methyl tertiary butyl ether. The obtained compound was slurried in methyl tertiary butyl ether followed by in isopropanol and dried to get the title compound.

Yield: 204 g; PXRD pattern of the obtained compound is illustrated in FIG. 19; M.R: ~250° C. Purity by HPLC: 96.21%.

Example-25: Preparation of 2-chloro-7-cyclopentyl-N,N-dimethyl-7H-pyrrolo[2,3-d]pyrimidine-6-carboxamide Mixture of 2-chloro-7-cyclopentyl-7H-pyrrolo[2,3-d]pyrimidine-6-carboxylic acid (55 g), dimethyl formamide (550 ml), (2-(1H-benzotriazol-1-yl)-1,1,3,3-tetramethyluronium hexafluorophosphate (78.5 g) and N,N-diisopropylethylamine (107.5 ml) was stirred for 10 minutes at 25-30° C. and cooled to 0-5° C. To this reaction mixture dimethylamine solution (165 ml) was slowly added at 0-5° C. and stirred it for 3 hours at the same temperature. The reaction mixture was quenched with water at 0-5° C. and followed by ethyl acetate was added. Raised the temperature of the mixture to 25-30° C. and separated both organic and aqueous layers. Aqueous layer was extracted with ethyl acetate and combined the organic layers. Organic layer was washed with water, aqueous sodium carbonate solution and followed by with aqueous sodium chloride solution. Organic layer was dried over anhydrous sodium sulphate. Distilled off solvent completely from the organic layer under reduced pressure and co-distilled with n-heptane. To this obtained compound ethyl acetate (25 ml) and n-heptane (200 ml) were added at 25-30° C., heated the mixture to 40-45° C. and stirred for 10 minutes at the same temperature. Cooled the mixture to 25-30° C. and stirred for 12 hours at the same temperature. Filter the solid, washed with n-heptane and dried to get the title compound.

Figure 17:
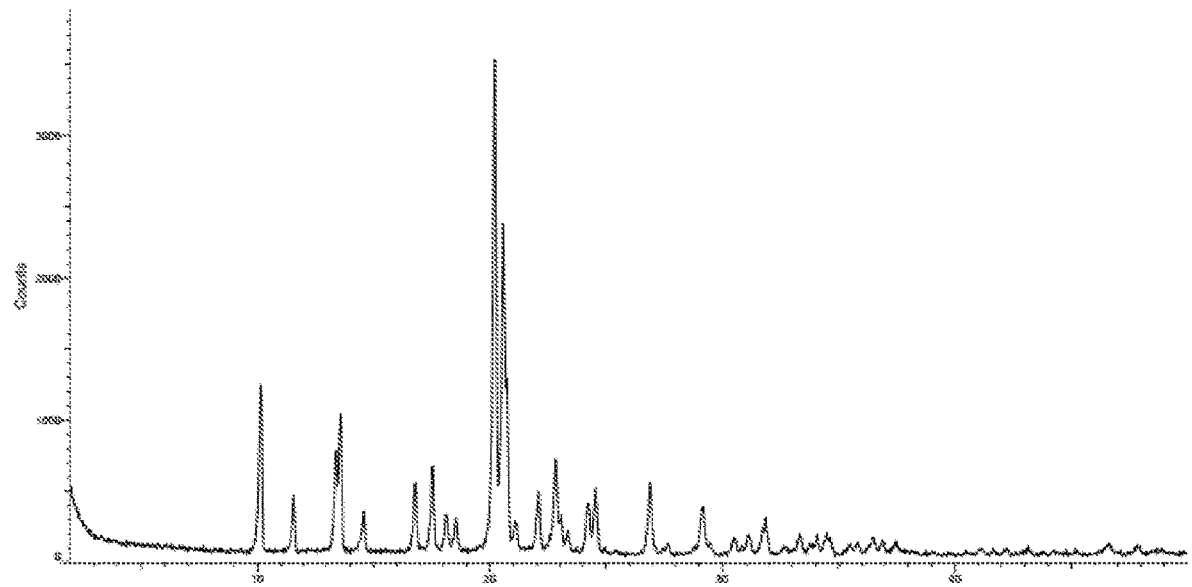
FIG. 17: Illustrates the PXRD pattern of the compound of formula-7.

Yield: 22.2 g; PXRD pattern of the obtained compound is illustrated in FIG. 17.

Example-26: Preparation of 2-chloro-7-cyclopentyl-N,N-dimethyl-7H-pyrrolo[2,3-d]pyrimidine-6-carboxamide Step-A: Mixture of 2-chloro-7-cyclopentyl-7H-pyrrolo[2,3-d]pyrimidine-6-carboxylic acid (40 g), toluene (200 ml) and thionyl chloride (39 ml) at 25-30° C. stirred for 10 minutes under nitrogen atmosphere, heated to 110-115° C. and stirred for 6 hours at the same temperature. Distilled off solvent partially and cooled the mixture to 25-30° C.

Step-B: Mixture of dimethylamine hydrochloride (49 g), tetrahydrofuran (200 ml) and triethylamine (95 ml) at 25-30° C. cooled to 0-5° C. and slowly added above obtained acid chloride reaction mixture and stirred for 3 hours at the same temperature. To this reaction mixture ethyl acetate and water were added and raised the temperature to 25-30° C. Separated the both organic and aqueous layers and aqueous layer was extracted with ethyl acetate. Combined the organic layers and washed with aqueous sodium chloride solution and followed by with water. Dried the organic layer with anhydrous sodium sulfate and distilled off solvent completely from the organic layer. n-Heptane (160 ml) was added to this obtained residue at 25-30° C. and stirred 10 minutes at the same temperature. Cooled the mixture to 0-5° C. and stirred for 2 hours at the same temperature. Filtered solid, washed with n-heptane and dried get the title compound.

Yield: 36 g

Example-27: Preparation of 2-chloro-7-cyclopentyl-N,N-dimethyl-7H-pyrrolo[2,3-d]pyrimidine-6-carboxamide Thionyl chloride (55 ml) was added to the mixture of 2-chloro-7-cyclopentyl-7H-pyrrolo[2,3-d]pyrimidine-6-carboxylic acid (100 g), toluene (500 ml) and dimethyl formamide (10 ml) at 0-5° C. and stirred for 10 minutes under nitrogen atmosphere. Heated the reaction mixture to 90-95° C. and stirred for 4 hours at the same temperature. Distilled off solvent partially and cooled the mixture to 25-30° C. Tetrahydrofuran (100 ml) and toluene (500 ml) was added to the obtained compound. The resultant mixture was slowly added to pre-cooled 40% aqueous dimethylamine solution (400 ml) at 0-5° C. and stirred the reaction mixture for 2 hours at the same temperature. The reaction mixture was quenched with water and raised the temperature of the resultant mixture to 25-30° C. Separated the both organic and aqueous layers and the aqueous layer was extracted with toluene. Combined the organic layers and washed with aqueous sodium chloride solution. Distilled off solvent completely from the organic layer and co-distilled with n-Heptane. The obtained compound was slurried in n-heptane and dried to get the title compound.

Yield: 92 g; PXRD pattern of the obtained compound is similar to the FIG. 17; M.R: 100.6° C. to 102.1° C. Purity by HPLC: 99.69%.

Example-28: Preparation of 7-cyclopentyl-N,N-dimethyl-2-((5-(4-tritylpiperazin-1-yl) pyridine-2-yl) amino)-7H-pyrrolo[2,3-d]pyrimidine-6-carboxamide The mixture of 5-(4-tritylpiperazin-1-yl)pyridin-2-amine (36 g), 2-chloro-7-cyclopentyl-N,N-dimethyl-7H-pyrrolo[2,3-d]pyrimidine-6-carboxamide (25 g) and tetrahydrofuran (125 ml) was cooled to 0-5° C. Sodium bis(trimethylsilyl) amide (138 ml) was slowly added to the reaction mixture at 0-5° C. and stirred for 4 hours at same temperature. Reaction mixture was quenched with aqueous ammonium chloride solution at 0-5° C. and stirred for 20 minutes at the same temperature. Water was added to the mixture at 0-5° C. and stirred for 3 hours at the same temperature. Filter the solid, washed with water and dried to get the title compound.

Yield: 56 g; PXRD pattern of the obtained compound is illustrated in FIG. 18.

Example-29: Preparation of 7-cyclopentyl-N,N-dimethyl-2-((5-(4-tritylpiperazin-1-yl) pyridine-2-yl) amino)-7H-pyrrolo[2,3-d]pyrimidine-6-carboxamide The mixture of 5-(4-tritylpiperazin-1-yl)pyridin-2-amine (115 g), 2-chloro-7-cyclopentyl-N,N-dimethyl-7H-pyrrolo[2,3-d]pyrimidine-6-carboxamide (80 g) and tetrahydrofuran (400 ml) was cooled to −5-0° C. Sodium bis(trimethylsilyl)amide (376 ml) was slowly added to the mixture at −5-0° C. and stirred for 4 hours at same temperature. Reaction was quenched with aqueous ammonium chloride solution at 0-5° C. and stirred the resultant mixture at the same temperature. Distilled off the solvent completely from reaction mixture and cooled to 25-30° C. Slurried the resultant material in the mixture of water and acetone. The obtained compound was slurried in water followed by in acetone and dried to get the title compound.

Yield: 166 g; PXRD pattern of the obtained compound is illustrated in FIG. 20; M.R: above 300° C.

Example-30: Preparation of 7-cyclopentyl-N,N-dimethyl-2-((5-(piperazin-1-yl)pyridin-2-yl)amino)-7H-pyrrolo[2,3-d]pyrimidine-6-carboxamide Mixture of 7-cyclopentyl-N,N-dimethyl-2-((5-(4-tritylpiperazin-1-yl) pyridine-2-yl)amino)-7H-pyrrolo[2,3-d] pyrimidine-6-carboxamide (55 g) and toluene (165 ml) was cooled to 0-5° C. 6N hydrochloric acid (165 ml) was added to the mixture at 0-5° C. and stirred for 2 hours at the same temperature. Raised the temperature of reaction mixture to 25-30° C. and separated both organic and aqueous layers. The aqueous layer was washed with ethyl acetate and dichloromethane. Basified the aqueous layer with aqueous sodium hydroxide solution at 0-5° C. and stirred for 2 hours at the same temperature. Filter solid and washed with water.

Water (130 ml) was added to above obtained compound at 25-30° C., heated to 40-45° C. and stirred for 60 minutes at the same temperature. Cooled the mixture to 25-30° C. and stirred for 2 hours at the same temperature. Filter the solid, washed with water and dried to get title compound.

Yield: 23 g.

Example-31: Preparation of Ribociclib of Formula-1

Isopropanol-hydrochloric acid (2000 ml) was added to the mixture of 7-cyclopentyl-N,N-dimethyl-2-((5-(4-tritylpiperazin-1-yl) pyridine-2-yl)amino)-7H-pyrrolo[2,3-d]pyrimidine-6-carboxamide (400 g) and isopropyl alcohol (8000 ml) at 25-30° C. stirred for 10 minutes. Heated the reaction mixture to 80-85° C. and stirred for 3 hours at the same temperature. Cooled the reaction mixture to 25-30° C. and stirred for 2 hours at the same temperature. Filtered the solid and washed with isopropyl alcohol. The resultant material was slurried in isopropyl alcohol. Dissolved the obtained compound in water at 25-30° C. The mixture was washed with toluene followed by with ethyl acetate. Basified the resultant mixture using aqueous ammonia at 5-10° C. Raised the temperature of the mixture to 25-30° C. and stirred for 2 hours at the same temperature. Filter the precipitated solid and washed with water. The obtained compound was added to an aqueous sodium chloride solution (226 g of sodium chloride in 1040 ml of water) at 25-30° C. and stirred for 2 hours at the same temperature. Filtered the solid, washed with aqueous sodium chloride solution and dried to get the title compound.

Figure 21:
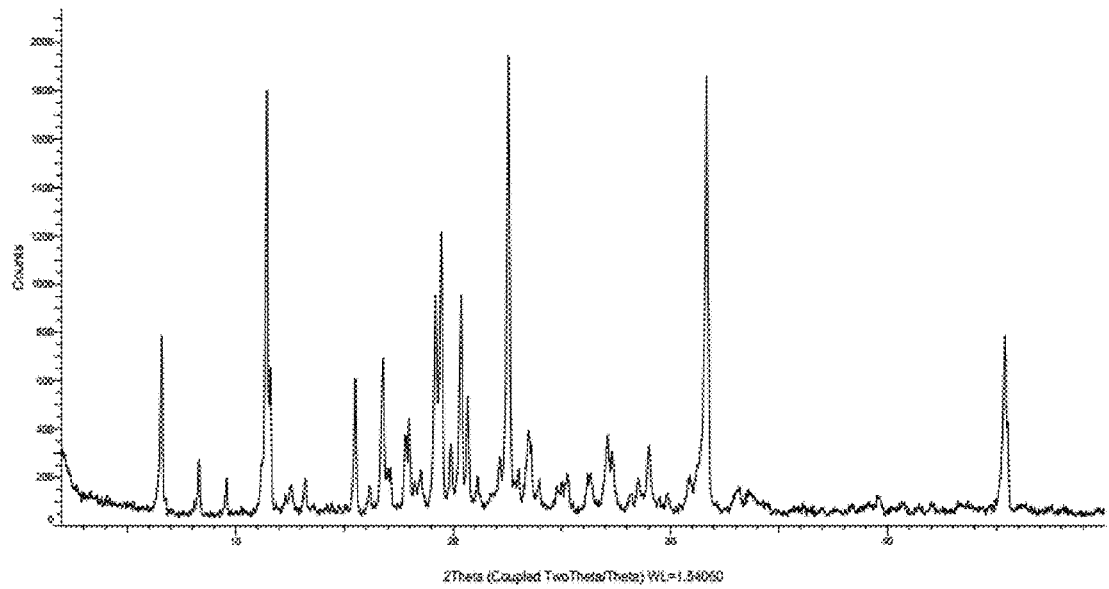
FIG. 21: Illustrates the PXRD pattern of Ribociclib obtained according the present invention.

Yield: 249 g. M.R.: 199-202° C.; NaCl content: 10-15%. PXRD pattern of the Ribociclib is illustrated in FIG. 21.

Example-32: Preparation of Crystalline Form-N1 of Ribociclib Succinate

Succinic acid (16.3 g) was dissolved in the mixture of acetone (1200 ml) and ethanol (1200 ml) at 25-30° C. and filtered the solution on micron filter. Ribociclib (50 g) obtained in example-31 was added to the filtrate at 25-30° C., heated the resultant mixture to 40-45° C. and stirred for 4 hours at the same temperature. Filtered the solid and dried to get the title compound.

Yield: 50 g. M.R.: 233-238° C. purity by HPLC: 99.86%; Water content by KF: 0.39%; PXRD of the obtained compound is illustrated in FIG. 15. Sodium chloride content: 10.61% w/w.

We claim:

1. Crystalline form-N1 of Ribociclib Succinate of formula-1a

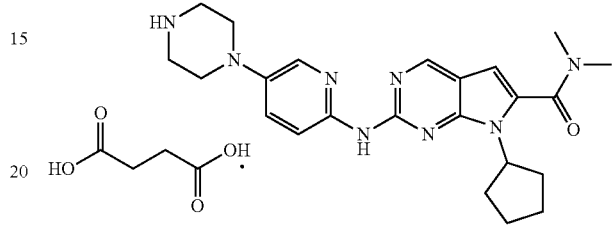

Formula-1a characterized by one or more of the following characteristics:
   a) PXRD (powder X-Ray diffractogram) pattern having peaks at 5.1°, 11.5°, 13.9°, 17.5° and 31.7°±0.2° 2θ; or
   b) PXRD pattern as illustrated in FIG. 15; or
   c) Differential Scanning calorimetry (DSC) having endotherm peak at 237°±3° C.; or
   d) Differential Scanning calorimetry (DSC) as illustrated in FIG. 22.

2. A process for the preparation of crystalline form-N1 of Ribociclib succinate of claim 1, comprising:
   a) dissolving succinic acid in a solvent,
   b) adding Ribociclib of formula-1,
   c) isolating crystalline form-N1 of Ribociclib succinate.

3. The process according to claim 2, wherein dissolving succinic acid in step-a) is carried out by heating the mixture to a temperature ranging from about 35° C. to reflux temperature of the solvent used.

4. A pharmaceutical composition comprising Crystalline form-N1 of Ribociclib succinate of claim 1 and at least one pharmaceutically acceptable excipient.

5. A method of treating a mammal by administering a therapeutically effective amount of Crystalline form-N1 of Ribociclib succinate of claim 1 for treating postmenopausal women with hormone receptor (HR)-positive, human epidermal growth factor receptor 2 (HER2)-negative advanced or metastatic breast cancer.

6. The process according to claim 2, wherein the solvent in step-a) is selected from alcohol solvents, ether solvent, ketone solvents, ester solvents or mixtures thereof.

7. The process according to claim 2, wherein isolating crystalline form-N1 in step-c) is carried out by removal of solvent using techniques selected from distillation, decanting, filtration, cooling the mixture to lower temperatures to precipitate the solid followed by filtration of the mixture, crystallization or by adding an anti-solvent.

* * * * *